United States Patent
Suzuki et al.

(10) Patent No.: US 9,063,663 B2
(45) Date of Patent: Jun. 23, 2015

(54) SEMICONDUCTOR STORAGE DEVICE AND DATA CONTROL METHOD THEREOF

(75) Inventors: Akifumi Suzuki, Nakai (JP); Atsushi Kawamura, Yokohama (JP); Junji Ogawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 635 days.

(21) Appl. No.: 12/936,176

(22) PCT Filed: Sep. 21, 2010

(86) PCT No.: PCT/JP2010/005724
§ 371 (c)(1),
(2), (4) Date: Aug. 8, 2011

(87) PCT Pub. No.: WO2012/039002
PCT Pub. Date: Mar. 29, 2012

(65) Prior Publication Data
US 2012/0072641 A1    Mar. 22, 2012

(51) Int. Cl.
*G06F 12/00* (2006.01)
*G06F 3/06* (2006.01)
*G06F 13/00* (2006.01)

(52) U.S. Cl.
CPC .............. *G06F 3/064* (2013.01); *G06F 3/0608* (2013.01); *G06F 3/0688* (2013.01)

(58) Field of Classification Search
CPC ........................... G06F 3/0679; G06F 12/0238
USPC .......................................... 711/100, 103, 154
See application file for complete search history.

(56) References Cited

U.S. PATENT DOCUMENTS

| | | | |
|---|---|---|---|
| 5,237,460 A * | 8/1993 | Miller et al. | 360/8 |
| 5,237,675 A * | 8/1993 | Hannon, Jr. | 710/68 |
| 5,512,921 A * | 4/1996 | Mital et al. | 345/555 |
| 6,446,145 B1 * | 9/2002 | Har et al. | 710/68 |
| 7,200,859 B1 * | 4/2007 | Perlman et al. | 725/133 |
| 7,430,638 B2 * | 9/2008 | Kellar | 711/118 |
| 7,631,121 B2 * | 12/2009 | Poo | 710/52 |
| 2008/0307191 A1 * | 12/2008 | Lane et al. | 711/209 |
| 2009/0070520 A1 | 3/2009 | Mizushima | |
| 2009/0086260 A1 | 4/2009 | Shin | |
| 2010/0161884 A1 | 6/2010 | Kurashige | |
| 2010/0281340 A1 * | 11/2010 | Franceschini et al. | 714/763 |

FOREIGN PATENT DOCUMENTS

EP    2 034 414 A1    3/2009

OTHER PUBLICATIONS

PCT International Search Report and Written Opinion on application No. PCT/JP2010/005724 dated Jun. 16, 2011; 9 pages.

* cited by examiner

*Primary Examiner* — Tuan Thai
(74) *Attorney, Agent, or Firm* — Foley & Lardner LLP

(57) ABSTRACT

The flash memory controller compresses data in response to a write request. On condition that there is a compression effect with respect to the compressed data, the flash memory controller writes the compressed data to the base area of a physical block of a flash memory. As physical pages assigned to the physical block, the flash memory controller reduces the physical pages assigned to the base area from 102 down to 59, and increases the physical pages assigned to the update area from 26 up to 69. Therefore, it is possible to suppress exhaustion of physical pages which are assigned to the update area, to reduce the number of erases of the physical block, and to consequently prolong device operating life.

14 Claims, 21 Drawing Sheets

FIG. 6

| LBA GROUP ADDRESS (601) | PBA GROUP ADDRESS (602) | UPDATE AREA START ADDRESS (603) | NEXT-WRITE ADDRESS (604) | COMPRESSION FLAG (605) | READ COUNT (606) |
|---|---|---|---|---|---|
| 0x000000000 (LBA Group 1) | 0x00A00000 (PBA Group 10) | 0xCE000 (Page 103) | 0xF0000 (Page120) | 0 | 3000 |
| 0x0000CC000 (LBA Group 2) | 0x00020000 (PBA Group 2) | 0x78000 (Page 60) | 0xE6000 (Page64) | 1 | 0 |
| 0x000198000 (LBA Group 3) | 0x00040000 (PBA Group 4) | 0xCE000 (Page 103) | 0xCE000 (Page 103) | 0 | 0 |
| 0x000264000 (LBA Group 4) | 0x00A50000 (PBA Group 165) | 0x64000 (Page 50) | 0x68000 (Page 54) | 1 | 1000 |
| 0x000330000 (LBA Group 5) | 0x00D80000 (PBA Group 216) | 0xCE000 (Page 103) | 0xCC000 (Page 102) | 0 | 5000 |
| 0x000FC0000 (LBA Group 6) | UNASSIGNED | – | – | – | – |
| ~ | ~ | ~ | ~ | ~ | ~ |
| (LBA Group N) | UNASSIGNED | – | – | – | – |

FIG. 13

| PBA GROUP ADDRESS | ERASE COUNT | PREVIOUS ERASE DATE AND TIME |
|---|---|---|
| 0x0010_0000 | 1123 | |
| 0x0020_0000 | 1256 | |
| 0x0030_0000 | 1356 | |
| 0x0040_0000 | 1224 | |
| 0x0050_0000 | 1267 | |
| 0x0060_0000 | 1242 | |
| ⁓ | ⁓ | ⁓ |
| 0x FFF0_0000 | 10 | |

FIG.17

| LBA PAGE ADDRESS ~1701 | PBA PAGE ADDRESS ~1702 | COMPRESSION FLAG ~1703 | COMPRESSED DATA LENGTH ~1704 | COMPRESSED-DATA RELATIVE ADDRESS ~1705 | READ COUNT ~1706 |
|---|---|---|---|---|---|
| 0x00000000000 LBA Page0 | 0x00014000 PBA Page10 | 0 | — | — | 8573 |
| 0x00000002000 LBA Page1 | 0x00004000 PBA Page2 | 1 | 0x3000 | 0x00006000 Page3 | 0 |
| 0x00000004000 LBA Page2 | 0x0001B0000 PBA Page216 | 0 | — | — | 5000 |
| 0x00000006000 LBA Page3 | 0x00004000 PBA Page2 | 1 | 0x3000 | 0x00004000 Page2 | 6984 |
| 0x00000008000 LBA Page4 | 0x0000A000 PBA Page5 | 0 | — | — | 1010 |
| 0x0000000A000 LBA Page5 | UNASSIGNED | — | — | — | — |
| ∼ | ∼ | ∼ | ∼ | ∼ | ∼ |
| 0xFFFFFF000 LBA Page N | UNASSIGNED | — | — | — | — |

1700

US 9,063,663 B2

SEMICONDUCTOR STORAGE DEVICE AND DATA CONTROL METHOD THEREOF

TECHNICAL FIELD

The present invention relates to a semiconductor storage device and, more particularly, to a semiconductor storage device and data control method thereof comprising a data input and output processing function for a storage device which includes, as a storage medium, a flash memory which is one type of involatile memory that is electrically rewritable.

BACKGROUND ART

Flash memory is characterized by the fact that data cannot be rewritten to a data area that has already been recorded. For this reason, in order to update recorded data, processing is required to erase a recorded area after reading the recorded data and then write update data to the erased unwritten area.

However, the time taken to erase flash memory is long compared to the write time, which greatly lowers the device performance, and therefore a method is typically adopted for a data update, whereby, once the recorded data has been read, update data is generated integrally with the write data, the generated update data is written to another unwritten area, and the original recorded area is invalidated (a process which renders the host system unable to reference this area). When unwritten area is exhausted, invalidated area is erased to generate a new unwritten area.

However, with flash memory, since the minimum erase unit is large in comparison with the minimum write unit, an erased area may sometimes include an area (valid area) which stores valid data which has not been invalidated. It is therefore necessary to write-copy all the valid data in a valid area within an area which is to be erased to another area, invalidate the whole erase-target area, and then delete all the data in the erase target area.

In this processing, it is necessary to sequentially update correspondence between an address space published to the host system and an address space where the internal physical recording area is managed, and management systems serving this purpose have already been disclosed (PTL1, for example).

In PTL1, a logical block, which includes a plurality of physical blocks that are the minimum erase units, holds at least two logical page sets obtained by combining a plurality of physical pages which are minimum write units, where a first logical page set is used in the recording of normal data, and a second logical page set is used to record update data of the first logical page set (hereinafter the first logical page set will be called the base area and the second logical page set will be called the update area). When the update area is exhausted, update area is reserved once again by reading all the data of the logical blocks, erasing all the logical blocks and then rewriting by switching the data of the update area to the base area.

Furthermore, PTL2 discloses a method with which, in response to a change in the stored data volume arising from a conversion algorithm for compression or encryption or the like, the individual units of converted data are identified and, based on the identification result, the stored data is stored in an area with a successive address.

CITATION LIST

Patent Literature

PTL 1: US Patent Publication No. 2009/0070520
PTL 2: US Patent Publication No. 2009/0086260

SUMMARY OF INVENTION

Technical Problem

With flash memory, the minimum erase unit is larger than the minimum write unit and the foregoing erase operation requires write copying of data in a valid area, and therefore the actual write volume to the flash memory increases in comparison with the data write volume from the host system. The rate of increase is typically referred to as the WA (Write Amplification), and when an equal amount of writing is performed on a device with a large WA and a device with a small WA, the device with a large WA will be subject to a large number of write and erase processes.

However, with flash memory, physical wear will be generated within the device as a result of repeated data recording and erase processing, and holding recorded data will gradually become difficult until ultimately data can no longer be held. For this reason, a storage system which utilizes flash memory as a medium is restricted in the number of times that an erase operation can be performed, and the upper limit for the number of erases defines the device operating life. Therefore when the aforementioned WA is small, the device is afforded a long operating life.

In a method, as disclosed in PTL1, for managing areas where normal data is recorded and areas where update data is recorded, data updates are processed as writing to the update areas. Furthermore, when the amount of update area remaining is exhausted, erase processing is performed to reserve more area. For this reason, if there is a large amount of update area, the erase frequency can be lowered and the WA reduced.

However, reserving the update area reduces the recording capacity published to the host system of the total recording capacity of the medium installed in the device, and the cost per bit of the device rises. In other words, in order to extend the device operating life at low cost, the physical capacity must be increased through data compression, and the recording area assigned as the update area must be increased, which is not disclosed in any way in PTL1 and PTL2.

On the other hand, with flash memory, the read/write processing time is shorter than that of a HDD (Hard Disk Drive) or other such storage device and the time for data compression conversion and inverse transformation brings about a drop in performance; it is therefore preferable to avoid compressing data which requires high performance as well as data which is referenced frequently (with a high read frequency).

Moreover, with flash memory, the minimum write unit is larger than that of a HDD or other such storage device and not recordable, and therefore unless the write area reduced through compression is greater than the minimum write unit, compression has no effect. It is therefore necessary to identify what the compression effect will be and determine whether or not compression is necessary.

The compression target data volume subject to the compression effect must also be identified and compression processing must be executed in units of this data volume. Furthermore, data compression/decompression inevitably take time and this time is an overhead that contributes to reduced device performance. In order to alleviate this reduced device performance, rather than simply targeting compression effect data for compression, data of a low reference and update frequency is preferably selected for compression.

The present invention solves the aforementioned problems with flash memory, and an object of the present invention is to provide a semiconductor storage device and a data control method thereof allowing a longer device operating life.

Solution to Problem

In order to achieve the above object, the present invention comprises a plurality of flash memories which include a plurality of blocks of a physical block which is a batch erase unit, as data storage areas; and a flash memory controller which controls data input and output to and from the plurality of flash memories in response to an access request from an access request source, wherein each of the physical blocks in each of the flash memories includes a plurality of physical pages which are minimum write units, wherein the flash memory controller if the access request is a write request, selects a physical block belonging to any of the flash memories based on the write request, compresses write data which is added to the write request, and on condition that there is a greater reduction in the physical pages required for storing the write data added to the write request when the compressed write data is stored in the selected physical block than when the write data is stored in the selected physical block as is, writes the compressed write data to any of the physical pages of the selected physical block. At this point, by determining the data compression effect an compression can also be performed against only data with a certain data reduction effect as a compression target. In addition, in the event of a reclamation operation or refresh operation, the read frequency of the data selected in the reclamation operation or refresh operation is determined and data with a low read frequency can also be selectively compressed.

Advantageous Effects of Invention

According to the present invention, the number of times the physical blocks belonging to the flash memory are erase targets can be reduced in order to prolong a longer device operating life.

BRIEF DESCRIPTION OF DRAWINGS

FIG. 6 shows an explanatory view of LBA/PBA conversion management information according to the first embodiment.

FIG. 13 shows an explanatory view of erase management information according to the second embodiment.

FIG. 17 shows an explanatory view of LBA/PBA conversion management information according to the third embodiment.

DESCRIPTION OF EMBODIMENTS

Embodiments according to the present invention will be explained hereinbelow with reference to the drawings. Note that the present invention is not limited to the embodiments described hereinbelow.

Example 1

The first embodiment (Example 1) is configured such that the physical blocks, which are batch erase units among the data storage areas of the flash memory, are each divided into a base area which is a storage destination of new write data and an update area which is a storage destination of update data, and a physical page, which is a minimum write unit, is divided into a plurality of pages in the base area and the update area respectively, and when data is stored on any of the physical pages of a physical block based on a write request, the write data added to the write request is compressed, and on condition that the physical pages serving as write targets are reduced, the compressed data is stored on any of the physical pages, the number of physical pages assigned to the base area belonging to the physical block is reduced, and the number of physical pages assigned to the update area of the physical block is increased.

Figure 1:
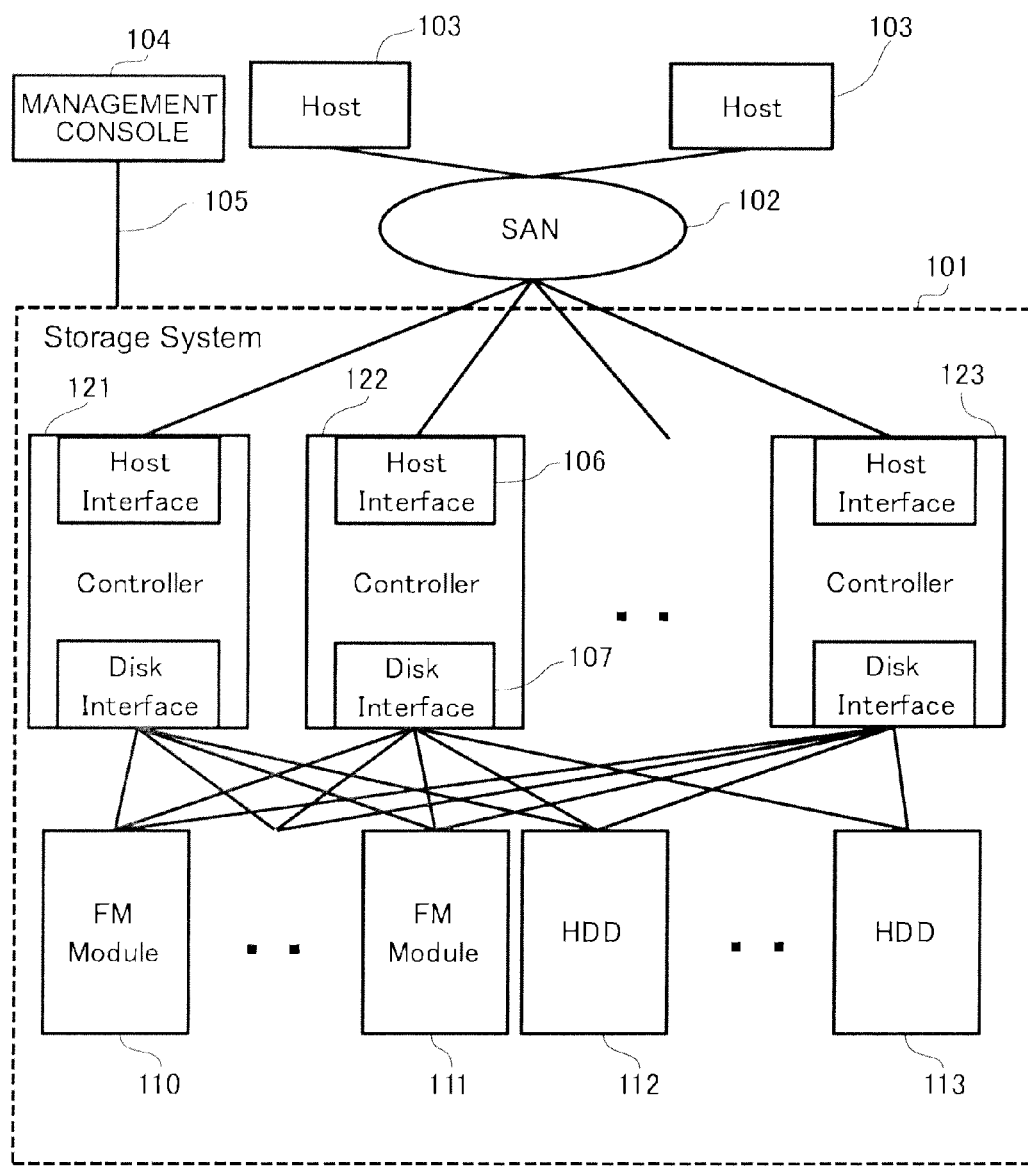
FIG. 1 shows a schematic configuration diagram of a computer system according to the present invention.

FIG. 1 is a schematic configuration diagram of a computer system which includes a semiconductor storage device which comprises a flash memory on a medium according to the present invention. Flash modules 110 to 111 shown in FIG. 1 are semiconductor storage devices to which the present invention is applied and in which flash memory serves as the medium.

A storage system 101 comprises a plurality of storage controllers (four thereof, for example) 121 to 123. The storage controllers 121 to 123 each comprise a plurality of host interfaces 106 for connecting to host systems 103 and a plurality of disk interfaces 107 for connecting to storage devices such as flash modules 110 to 111 and HDD 112 to 113.

Examples of the host interfaces 106 include devices corresponding to protocols such as FC (Fibre Channel), iSCSI (internet Small Computer System Interface), and FCoE (Fibre Channel over Ether), for example, and the host interfaces 106 are each connected to a plurality of host systems (host computers) 103 via a network 102. Examples of the network 102 include, for example, a SAN (Storage Area Network).

Examples of the disk interfaces 107 include, for example, devices corresponding to various protocols such as FC, SAS (Serial Attached SCSI), SATA (Serial Advanced Technology Attachment), and are connected via an internal network to storage devices (recordable devices) such as the flash modules 110 to 111 and HDD 112 to 113.

Furthermore, although not shown in FIG. 1 for the sake of simplicity, the storage controllers 121 to 123 comprise hardware resources such as a processor and memory and, under the control of a processor, issue read/write requests to storage devices such as the flash modules 110 to 111 and HDD 112 to 113 in response to access requests from the host systems 103 which issue the access requests such as read/write requests, for example.

Furthermore, the storage controllers 121 to 123 comprise a RAID (Redundant Array of Inexpensive Disks) Parity generation function and a RAID-Parity based data recovery function, and manage, as RAID groups in optional units, the plurality of flash modules 110 to 111 and the plurality of HDD 112 to 113. Furthermore, the RAID groups are divided up in optional units as LU (Logical Units) and the divided RAID groups are presented to each of the host systems 103 as storage areas.

When a write request is received by an LU from a host system 103, the storage controllers 121 to 123 generate Parity according to the designated RAID configuration and write the generated Parity to the storage device. In addition, when a read request is received by an LU from a host system 103, the storage controllers 121 to 123 read data from the storage device and then investigate whether there is data loss, and if data loss is detected, recover the data using the Raid Parity and transfer the recovered data to the host system 103.

In addition, the storage controllers 121 to 123 include a function for monitoring and managing faults, usage states, and operating states and so on of the storage devices.

The storage system 101 is connected to a management console 104 and a network 105. Examples of the network 105 include, for example, a LAN (Local Area Network). Although this is omitted from FIG. 1 for the sake of simplicity, this network 105 is connected to each of the storage controllers 121 to 123 in the storage system 101. Note that the network 105 may also be connected by a SAN like the network 102.

The management console 104 is a computer which comprises hardware resources such as a processor, a memory, a network interface, and a local I/O device, and software resources such as a management program. The management console 104 acquires information from the storage system 101 by means of the program and displays a management screen 1550 such as that shown in FIG. 15, for example.

The system administrator uses the management screen 1550 to perform control to monitor and operate the storage system 101.

There are a plurality of (for example sixteen) flash modules 110 to 111 in the storage system 101 which are likewise connected via disk interfaces 107 to a plurality of storage controllers 121 to 123 in the storage system 101. The flash modules 110 to 111 store data which is transferred in response to write requests from the storage controllers 121 to 123 and acquire the stored data in response to read requests and transfer the data to the storage controllers 121 to 123.

Here, the disk interface 107 designates logical storage points for the read/write requests by means of logical addresses (hereinafter LBA: Logical Block Addresses). Furthermore, a plurality of flash modules 110 to 111 are managed divided into a plurality of RAID configurations and have a configuration whereby lost data can be recovered when data loss occurs.

There are a plurality of (for example one hundred twenty) HDD (Hard Disk Drives) 112 to 113 in the storage system 101 which are likewise connected via disk interfaces 107 to a plurality of storage controllers 121 to 123 in the same storage system 101 as per the flash modules 110 and 111. The HDD 112 to 113 store data which is transferred in response to write requests from the storage controllers 121 to 123 and acquire the stored data in response to read requests and transfer the data to the storage controllers 121 to 123.

Note that here the disk interface 107 designates a logical storage point for the read/write request by means of a logical address (hereinafter LBA: Logical Block Address) Furthermore, a plurality of flash modules 110 to 111 are managed divided into a plurality of RAID configurations and have a configuration whereby lost data can be recovered when data loss occurs.

The storage controllers 121 to 123 are connected via the host interfaces 106 to the network (SAN) 102 which is connected to the host systems 103. Note that although omitted from FIG. 1 for the sake of simplicity, a connection path which mutually communicates data and control information between the storage controllers is also provided.

The host systems 103 correspond to computers or file servers or the like which form the core of the business affair system, for example. The management console 103 comprises hardware resources such as a processor, a memory, a network interface, and a local I/O device, and software resources such as device drivers, an operating system (OS), and application programs.

The host systems 103 communicate with the storage system 101 and issue data read/write requests by running various programs under the control of the processor. Furthermore, the host systems 103 acquire management information such as usage states and operating states of the storage system 101 by running various programs under the control of the processor. The host systems 103 are also able to designate and change the storage-device management units, the storage-device control method, and the data compression configuration and so on.

A computer system configuration which includes the flash modules 110 and 111 to which the present invention is applied has been described thus far. Note that in the configuration shown in FIG. 1, the flash modules 110 and 111 are contained in the storage system and connected to the host systems 103 via the storage controllers 121 to 123 but the present invention is not limited to the configuration shown in FIG. 1. The present invention may also be applied to a configuration in which the flash modules 110 and 110 are directly connected to the disk interfaces 107 and host systems 103 which comprise the management program.

The internal configuration of the flash module 110 will be explained next using FIG. 2. Note that because the other flash module 111 also has the same configuration as the flash module 110, the flash module 111 will not be illustrated or described here.

Figure 2:
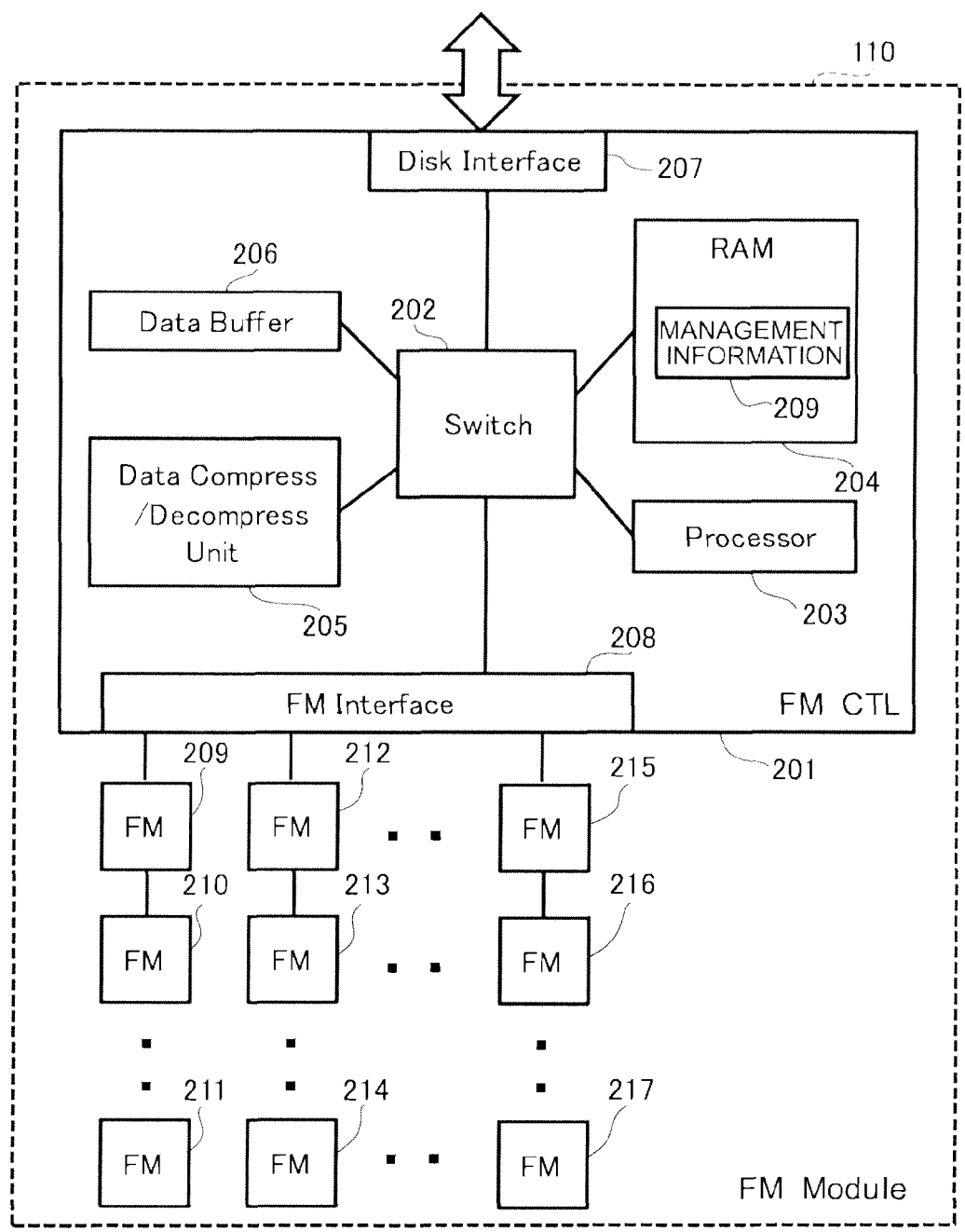
FIG. 2 shows a configuration diagram of a flash module to which the present invention is applied.

FIG. 2 shows the internal configuration of the flash module 110. In FIG. 2, the flash module 110 contains a flash memory controller 201 and a plurality of (for example thirty-two) flash memories 209 to 217.

The flash memory controller 201 contains a processor 203, a RAM (Random Access Memory) 209, a data compress/decompress unit 205, a data buffer 206, a disk interface 207, a flash memory interface 208, and a switch 202 for mutual data transfer.

The switch 202 connects the processor 203, the RAM 209, the data compress/decompress unit 205, the data buffer 206, the disk interface 207, and the flash memory interface 208 which are in the flash memory controller 201, and transfers the data between each of the these parts by routing the data using addresses or IDs (IDentifiers).

The disk interface 207 is connected to the disk interfaces 107 which the storage controllers 121 to 123 in the storage system 101 comprise and is connected to the parts of the flash memory controller 201 via the switch 202.

The disk interface 207 receives read/write requests and LBA designating request-target logical storage points from the disk interfaces 107 which the storage controllers 121 to 123 in the storage system 101 comprise and receives write data when a write request is made. Furthermore, the disk interface 207 also receives a control command of the flash module 110 and, in response to the command, notifies the storage controllers 121 to 123 of the operating states, usage states, and current configuration values of the flash module 110.

The processor 203 is connected to each of the parts of the flash memory controller 201 via the switch 202, and controls the whole flash memory controller 201 based on the program and management information recorded in the RAM 209. Furthermore, the processor 203 monitors the whole flash memory controller 201 by means of a regular information acquisition and interrupt reception function.

When a data transfer is made using the flash memory controller 201, the data buffer 206 stores temporary data in the course of the data transfer processing.

The flash memory interface 208 is connected to the flash memories 209 to 217 by means of a plurality of buses (for example sixteen). A plurality (for example two) of flash memories are connected to each bus and CE (Chip Enable) signals which are likewise connected to the flash memories are used to distinguish and control a plurality of flash memories 209 to 211, 212 to 214, and 215 to 217 which are connected to the same bus.

The flash memory interface 208 operates according to read/write requests designated by the processor 203. Here, the flash memory interface 208 indicates request targets by means of physical addresses (hereinbelow PBA: Physical Block Addresses). After receiving a PBA, the flash memory interface 208 calculates the flash memory, physical block, and physical page based on the PBA, and issues a read/write request designating the physical block and physical page to the flash memory targeted by the request.

During a read operation, the flash memory interface 208 reads stored data from the flash memories 209 to 217 and transfers the stored data to the data buffer 206, and during a write operation reads write data during a write operation from the data buffer 206 and writes the write data to the flash memories 209 to 217.

Furthermore, the flash memory interface 208 comprises an ECC (Error Correcting Code) generation circuit, an FCC data loss detection circuit, and an ECC correction circuit, and when writing, writes data by appending an ECC to the data. Furthermore, during data reading, the Hash memory interface 208 examines the read data from a flash memory by means of the ECC data loss detection circuit, and when data loss is detected, performs data correction by means of the ECC correction circuit.

The data compress/decompress unit 205 comprises a function for processing a lossless compression algorithm and comprises algorithms of various types and a compression level conversion function. The data compress/decompress unit 205 reads data from the data buffer 206 according to an instruction from the processor 203, performs a data compression calculation by means of a reversible compression algorithm or a data decompression calculation which is a data-compression inverse transformation, and writes the result once again to the data buffer 206. Note that the data compress/decompress unit 205 may be installed as a logic circuit and may implement the same functions by using the processor 203 to process a compress/decompress program.

The aforementioned switch 202, disk interface 207, processor 203, data buffer 206, flash memory interface 208, and data compress/decompress unit 205 may be configured in a single semiconductor device as an ASIC (Application Specific Integrated Circuit) or FPGA (Field Programmable Gate Array) or the configuration may comprise a plurality of mutually connected individual dedicated IC (Integrated Circuits).

Specific examples of the RAM 209 include, for example, volatile memory such as DRAM (Dynamic Random Access Memory). The RAM 209 stores management information of the flash memories 209 to 217 which are used in the flash module 110 and a transfer list which includes transfer control information used by DMA (Direct Memory Access) built into each disk interface 207. Note that the RAM 209 may also have a configuration used for data storage which includes some or all of the functions of the data buffer 206 storing the data.

The configuration of the flash module 105 to which the present invention is applied has an far been explained using FIG. 2.

The flash memory 209 will be explained next using FIG. 3. Note that because the other flash memories 210 to 217 are also the same as the flash memory 209, these flash memories will not be illustrated or described here.

Figure 3:
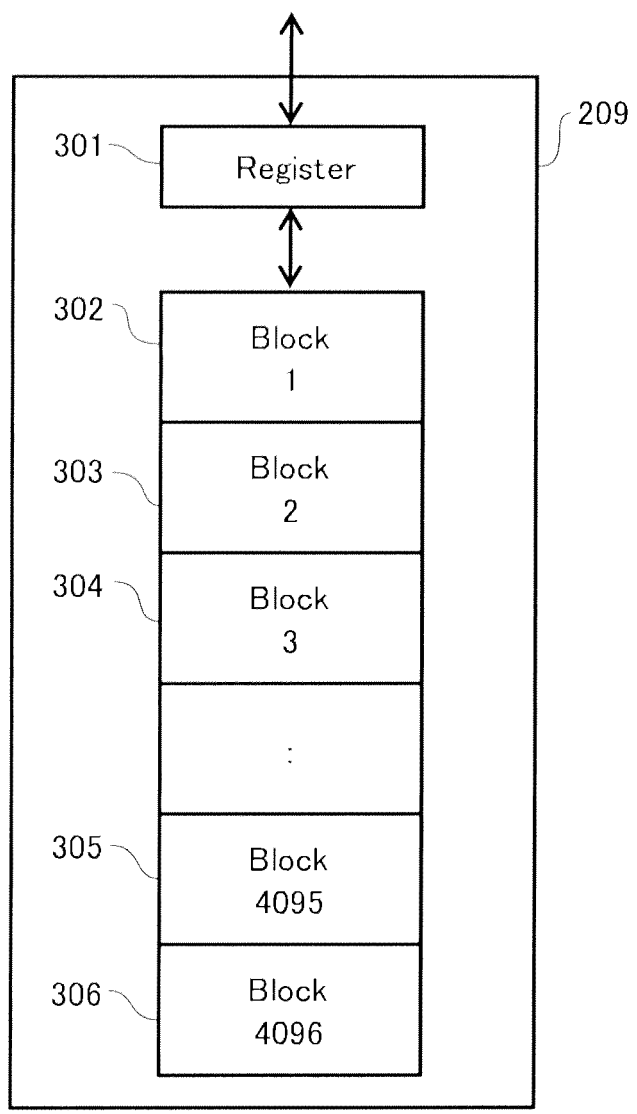
FIG. 3 shows a schematic diagram of a flash memory.

FIG. 3 shows the internal configuration of the flash memory 209. The involatile memory area in the flash memory 209 is configured from a plurality of (for example 4096) physical blocks 303 to 312 and can only undergo data erasure in physical block units.

Furthermore, the flash memory 209 contains an I/O register 301. The I/O register 301 is a register which holds a storage capacity (recording capacity) equal to or more than the physical page size (for example 8 KB).

The flash memory 209 operates according to read/write requests from the flash memory interface 208.

In a write operation, the flash memory 209 first receives a write command and request-target physical block and physical page from the flash memory interface 208. The flash memory 209 then stores write data which has been transferred via the flash memory interface 208 in the I/O register 301. Thereafter, the flash module 209 writes the data stored in the I/O register 301 onto the physical page designated by the PBA.

In a read operation, the flash memory 209 first receives a read command and request-target physical block and physical page from the flash memory interface 208. The flash module 209 then reads the data stored on the designated physical page of the physical block and stores this data in the I/O register 301. The flash module 209 then transfers the data stored in the I/O register 301 to the flash memory interface 208.

A physical block 302 will be explained next using FIG. 4. Note that because the other physical blocks 304 to 307 are also the same as the physical blocks 302, these physical blocks will not be illustrated or described here.

Figure 4:
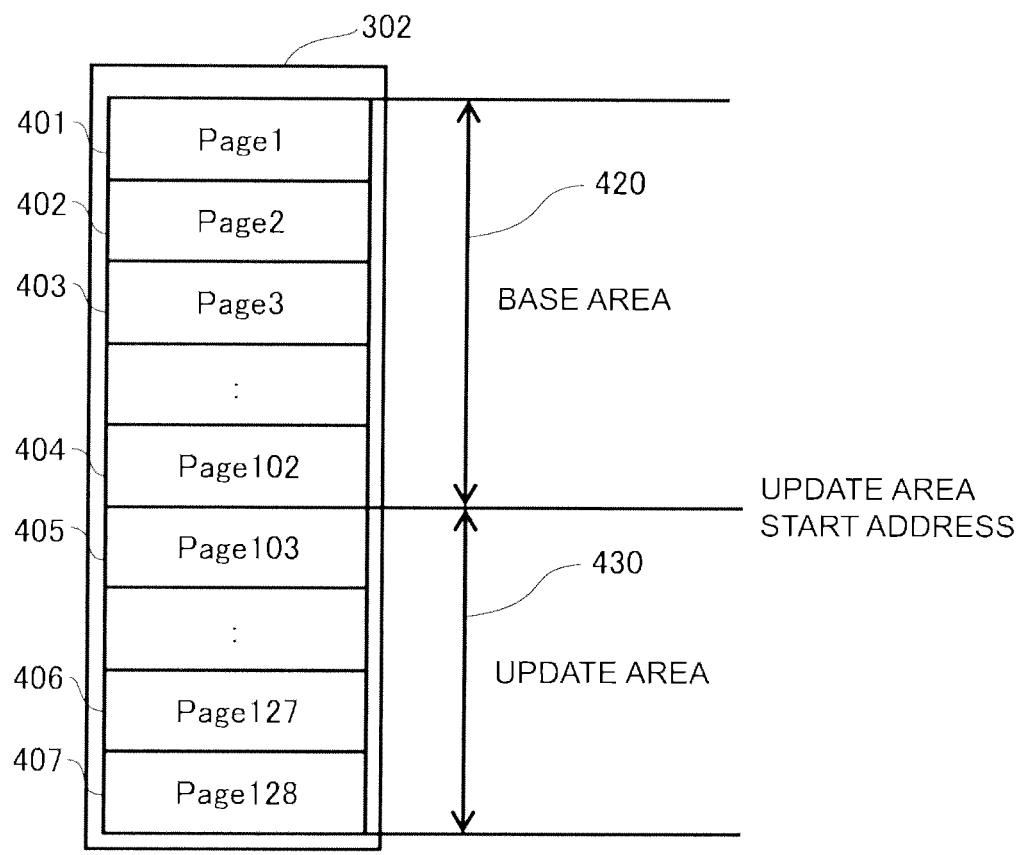
FIG. 4 shows a configuration diagram of a PBA group according to a first embodiment.

FIG. 4 is a diagram serving to illustrate the physical block 302. The physical block 302 is divided into a plurality (for example 128) of physical pages 401 to 407 and the reading of stored data and data writing can be processed only in physical page units. In addition, the order in which data is written to the physical pages 401 to 407 in the physical blocks 302 is prescribed and data must be written in the order of the physical pages 401, 402, 403 and so on. Moreover, overwriting a written page is prohibited and if a physical block to which the physical page belongs is erased, the page cannot be reprogrammed. Note that a base area 420 and update area 430 shown in FIG. 4 will be described next.

Thus far a description of the flash module 110 to which the present invention is applied and the computer system used by the flash module 110 have been described.

The management information used by the flash modules to which the present invention is applied will be explained next.

As mentioned earlier, the disk interface 207 of the flash memory controller 201 designates a read/write target area by means of an LBA from the higher-level storage controllers 121 to 123. The LBA differs from the PBA used in the calculation of a request-target physical page in the flash memory 209.

That is, the flash memory controller 201 assigns a PBA, which is an internal address, to the LBA designated by the storage controllers 121 to 123, executes address conversion (LBA/PBA conversion) to convert the LBA designated by the higher-level device 103 to a PBA, and executes a read/write operation based on the converted PBA.

By executing this address conversion, the flash memory controller 201 is able to optionally assign the storage area of the flash memory 209 in the flash module 110 to the LBA designated by the storage controllers 121 to 123, in units of a fixed data size.

Address conversion management information, which is used in the LBA/PBA conversion of the first embodiment, will be described hereinbelow using FIGS. 5 and 6.

Figure 5:
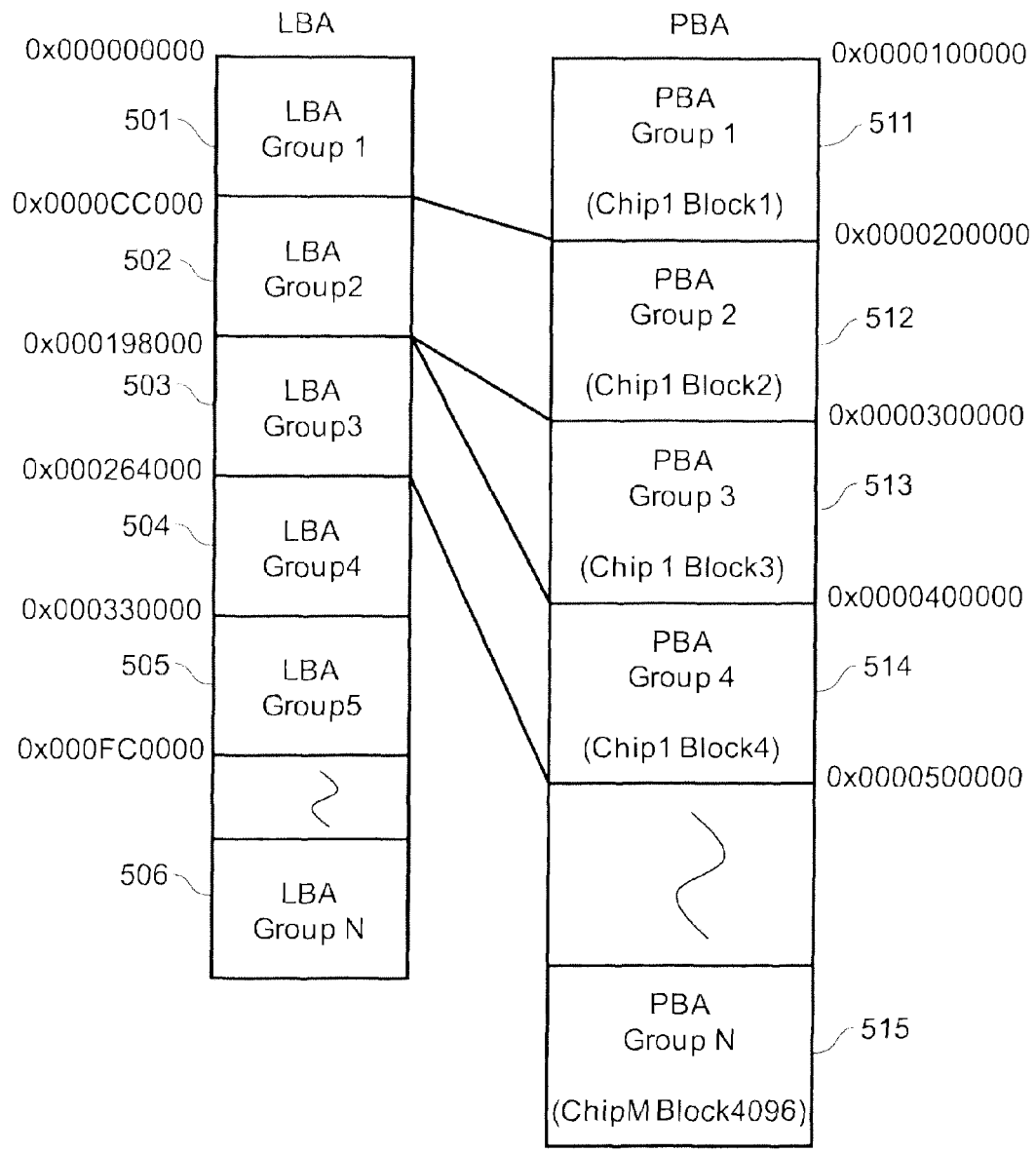
FIG. 5 shows conceptual view of address conversion according to the first embodiment.

FIG. 5 is a conceptual view which conceptually shows correspondence between an LBA space and PBA space according to the first embodiment. As shown in FIG. 5, in the first embodiment, the storage controllers 121 to 123 divide a referenced LBA space in 0xcc0000 (812 KB) units, manage each of these units as LBA groups 501 to 506, divide the PBA space in 0xcc000000 (1 MB) units, which is the physical block size, and manage the divided PBA as each of the PBA groups 511 to 515.

Here the storage controllers 121 to 123 manage each of the LBA groups 501 to 506 in association with the base areas 420 of any of the PBA groups 511 to 515, and manage both addresses as relative addresses between the associated LBA groups and the base areas 420 of the PBA groups.

Note that the units of division of the LBA spaces according to the present invention are not limited to 0xcc0000 (812 KB) and that optional division units may also be used. Furthermore, the PBA space division units may be an integer multiple of the physical block size and are not limited to 0x1000000 (1 MB).

The PBA spaces are associated consecutively in the number order of the flash memory 209 installed in the flash module 110 and the physical blocks 302 are associated consecutively in the number order of the physical blocks 302, a single physical block 302 is associated with each of the PBA groups 511 to 515. Furthermore, the physical pages 401 to 407 in the physical blocks 302 are also associated, consecutively in the number order of the physical pages starting with the start page of the physical block 302, with a PBA for every page size. As a result of this association, the flash memory numbers, physical block numbers, and physical page numbers can be uniquely calculated from an optional PBA.

According to the first embodiment, one PBA group 511 to 515 is assigned to each of the LBA groups 501 to 506. FIG. 5 shows an example in which a PBA group 512 is assigned to a LBA group 502 and a PBA group 514 is assigned to a LBA group 503.

Address conversion management information for managing the assignment of each of the LBA groups and PBA groups shown in FIG. 5 will be described next using FIG. 6.

The address conversion management information 600 according to the first embodiment and shown in FIG. 6 includes each of the following items: an LBA group start address 601, a PBA group start address 602, an update area start address 603, a next-write address 604, a compression flag 605, and a read count 606. Furthermore, the address conversion management information 600 is stored in the RAM 204 in the flash memory controller 201 in FIG. 2 and is referred to and changed by the processor 203.

The LBA group address 601 is an item which records the start addresses of all the LBA groups 501 to 506 shown in FIG. 5. For example, 0x000 cc000 which is the start address, is registered in the item corresponding to the LBA group 502 shown in FIG. 5.

The PBA group address 602 is an item for registering the start addresses (start page addresses) of the PBA groups assigned to each of the LBA groups. In addition, information which indicates non-assignment is registered for LBA groups to which PBA groups have not been assigned.

In FIG. 6, for example, a state is shown in which 0x000 cc000, which is the start address of the assigned PBA group 512, is registered in the item corresponding to the LBA group 502 shown in FIG. 5.

The update area start address 603 is an item for registering the start addresses of areas where update data is written during an update write operation in the PBA groups 511 to 515 assigned to each of the LBA groups. For example, it can be seen that 0x78000 (Page 60) is registered in the item corresponding to the LBA group 502 shown in FIG. 5 and that, when the LBA group 502 is subjected to an update write, update data is written to the 60th and subsequent physical pages in the PBA group 512.

The next-write address 604 is an item for registering the addresses to be written to next in the PBA groups 511 to 515 assigned to each of the LBA groups. This item is used to restrict writing by the system to the physical page with the preceding address value and to control the writing sequence in the flash memory 209 which is subject to a restricted write order in the physical block 302.

For example, 0xE6000 (Page 64) is registered in the item corresponding to the LBA group 502 shown in FIG. 5 and a data update to the LBA group 502 is written from the 64th physical page.

The compression flag 605 is an item which indicates that the stored data of the PBA groups assigned to the LBA groups 501 to 506 is in a data-compressed state. In the present embodiment, it can be seen that the PBA group 512 and PBA group 165 which are assigned to the LBA group 502 and LBA group 504, which have 1 recorded under the item compression flag 605 have undergone data compression. A PBA group which has undergone data compression will be referred to hereinbelow as a compressed PBA group.

The read count 606 is an item for registering the total number of reads generated in each of the LBA groups 501 to 506. The read count 606 is updated for each read operation of the flash module 110 and is reset at regular intervals. The erase interval may be any interval such as a few hours, one day, or one month, and the system administrator is able to configure/modify the erase interval in conjunction with a threshold value for determining the relative level of the read frequency by means of the read frequency 1504 item on the management screen 1550 shown in FIG. 15.

Thus far, address conversion management information 600 which is used in the assignment of PBA groups 511 to 515 to the LBA groups 501 to 506 and the management thereof has been described.

The correspondence between a PBA and an LBA in an LBA group when a PBA group is assigned to an LBA group will be described next. According to the present embodiment, a PBA group and compressed PBA group are formed with a single physical block 302 as a group area range and a physical block 302 with a physical block size 0x10000000 (1 MB) is configured from 128 physical pages 401 to 407 as shown in FIG. 4.

In the present embodiment, in the flash memories 209 to 217 for which the data erase time is longer than the write time and which do not allow data overwriting, update data is written to a physical page 302 that is separate from the physical page 302 for storing pre-update data in order to construct a flash module 110 capable of high-speed data updates. Here, assignment must be changed from a PBA indicating a physical page 302 storing pre-update data which has been assigned to the update request LBA to a PBA indicating a physical page 302 written with update data.

The page module 110 to which the present embodiment is applied is configured comprising, in the PBA groups, a PBA area (called the base area hereinbelow) for storing data on the LBA group area size and a PBA area (referred to hereinafter as the update area) which is assigned in each case in order to store update data when a data update is made to the LBA group.

Furthermore, in a compressed PBA group, data stored in the base area is compressed and the unused area generated by the compression is added and assigned to the update area. As a result of the increase in the update area, the number of times the flash memory is inevitably erased due to data updates can be reduced and, as a result, a longer operating life for the storage device, which is the effect of the present invention, can be achieved.

In order to achieve this result, LBA and PBA conversion in the PBA groups and compressed PBA groups assigned to the LBA groups is carried out in physical page size units which are the minimum read/write units of the flash memory 209. The way in which the stored data is managed for each of the PBA groups and compressed PBA groups will be described in detail hereinbelow.

FIG. 4 shows, as an example, a PGA group for which the item update area start address 603 of the address conversion management information 600 shown in FIG. 6 is registered at 0xCE0000 (Page 103), and, based on registration values, the 102nd physical pages 401 to 404 from the start of the physical block 302 are taken as the base area 420 and the pages from the 103rd physical page 405 to the last 128th physical page 407 are taken as the update area 430. Note that since the same is also true for other uncompressed PBA groups, an explanation of these groups is omitted here.

Figure 7:
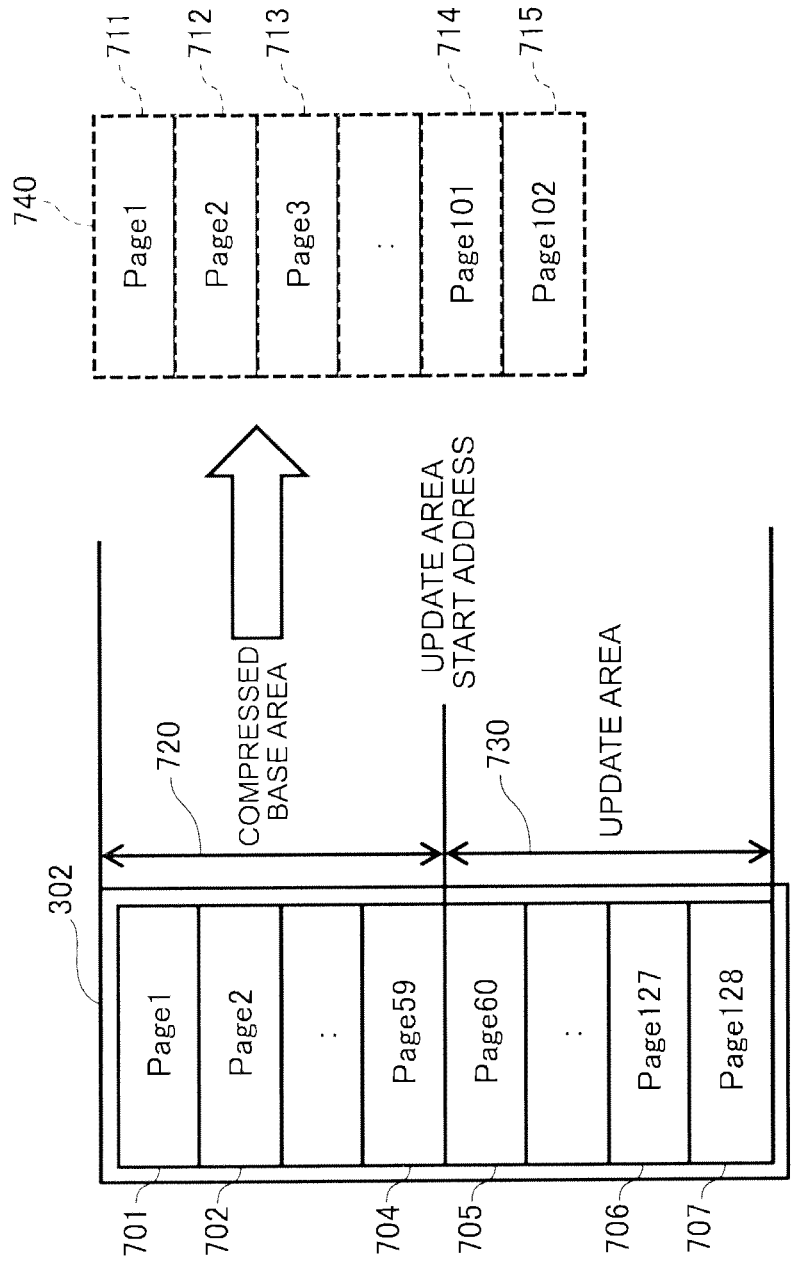
FIG. 7 shows a configuration diagram of a compression LBA group according to the first embodiment.

FIG. 7 shows a compressed PBA group for which the item update area start address 603 of the address conversion management information 600 shown in FIG. 6 is registered at 0x78000 (Page 60) and, based on registered values, the 59th physical pages 701 to 704 from the start of the physical block 302 are taken as the compressed base area 720 and the pages from the 60th physical page 705 to the last 128th physical page 707 are taken as the update area 730. Note that since the configuration of the base area and the update area is the same for the other compressed PBA groups which differ only in their update area start address, a description of these groups is omitted here.

As shown in FIG. 7, in order to compress the data stored in the base area 720 in a compressed PBA group, a value smaller than 0xCE000 (Page 103) which is the update area start address of an uncompressed PBA group can be registered and in comparison with an uncompressed PBA group, the number of physical pages assigned to the base area 720 is reduced from 102 to 59 and the number of physical pages assigned to the update area 730 is increased from 26 to 69.

For correspondence between the LBA and PBA in the base area 420 of uncompressed PBA groups, PBA are assigned consecutively starting with the start page (0th page) to each of the LBA. The addresses of the LBA and PBA in the base area 420 of an uncompressed PBA group are associated by means of a relative address and therefore the LBA which indicates a fourth page from the start address of the corresponding LBA group corresponds to the PBA of the fourth page of the PBA group base area assigned to the corresponding LBA group. Furthermore, the total site of the physical pages 401 to 404 assigned to the base area 430 (hereinafter referred to as the base area pages) is the same site as the LBA group if the PBA group is uncompressed.

Meanwhile the stored data of the base area 420 of an uncompressed PBA group is compressed and stored in a compressed PBA group. This area is referred to hereinbelow as the compressed base area 720. Correspondence between the LBA and PBA for the compressed base area 720 involves, for each LBA, consecutively assigning, starting with the start address (0th page), base area pages 711 to 715 (hereinafter referred to as compressed-data base area pages) which belong to a virtual base area (inverse-transformed base area) 740 obtained by decompressing the compressed data stored in the physical pages 701 to 704 of the compressed base area 720.

For example, the LBA indicating the fourth page from the start address of the corresponding LBA group corresponds to the fourth page of the compressed-data base area pages 711 to 715 of the compressed PBA group assigned to the corresponding LBA group. Furthermore, the number of physical pages 701 to 704 associated with the compressed base area 720 of the compressed PBA group changes depending on the data compression rate.

Here, if compressed write data is stored on the physical pages 701 to 704 which are associated with the compressed base area 720 of a compressed PBA group, the processor 203 forms a virtual base area 740 which is assigned physical pages 711 to 715 for storing compressed write data as data when this data is virtually decompressed, changes the corresponding relationship, between an LBA group and the base area 420 of the physical block 302 corresponding to the LBA group, to a corresponding relationship between the LBA group and the virtual base area 740 of the physical block 302 corresponding to the LBA group, and if the base area 420 of the physical block 302 is designated by means of a subsequent access request, processes the physical page assigned to the virtual base area 740 of the physical block 302 as an access destination.

When an update is generated in the stored data of the base area pages 401 to 404 of the same PBA group, the physical pages 405 to 407 assigned to the update area 430 of the uncompressed PBA group shown in FIG. 4 store update data of a page size obtained by reflecting the update in the previous data for the physical page size even when the update request is less than the physical page size.

Furthermore, when an update is generated in the stored data of the base area pages 701 to 704 of the same PBA group, the physical pages 705 to 707 assigned to the update area 730 of the compressed PBA group shown in FIG. 7 store update data of a page site obtained by reflecting the update in the previous data for the physical page size even when the update request is less than the physical page size.

Figure 8:
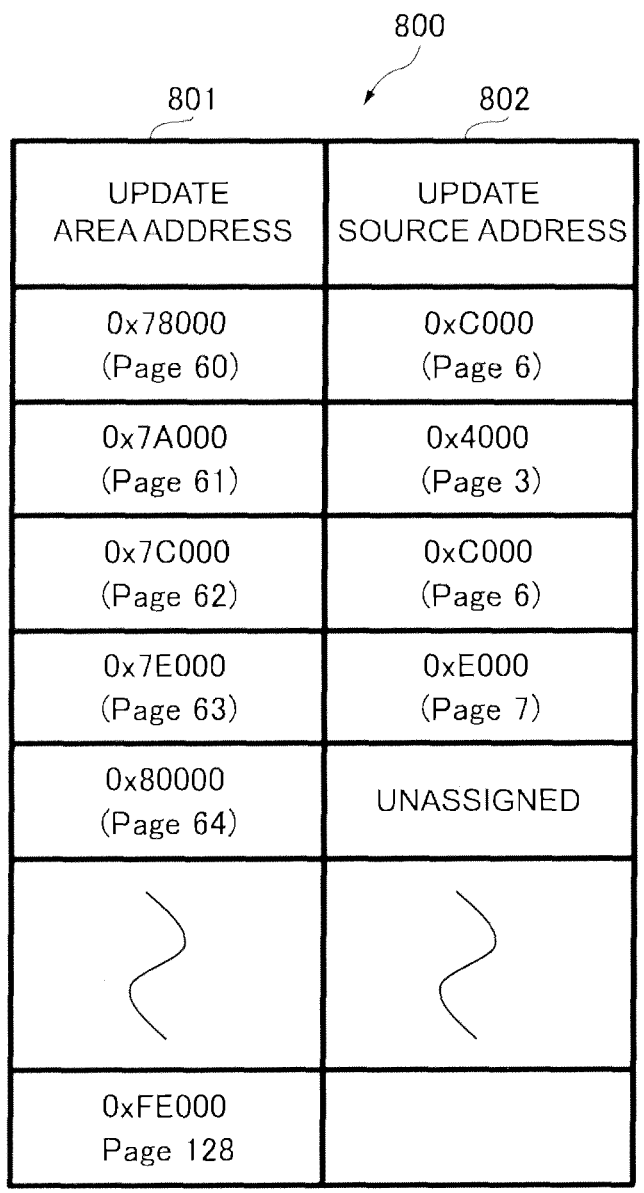
FIG. 8 shows an explanatory view of update area management information according to the first embodiment.

The correspondence between the PBA and LBA of the physical pages 405 to 407 of the update area 430 and the physical pages 705 to 707 of the update area 730 is managed by means of the update area management information 800 shown in FIG. 8.

FIG. 8 is an example of the update area management information 800 according to the first embodiment. The update area management information 800 shown in FIG. 8 includes at least update area address 801 and update source address 802 items and registers the information of each of these items for each of the physical pages of the update areas 430 and 730. Furthermore, the update area management information 800 is provided for each PBA group, stored in the RAM 204 in the flash memory controller 201 in FIG. 2, and referred to and updated by the processor 203.

The update area management information 800 of each PBA group comprises each of the item information for every physical page assigned to the update areas 430 and 730, from the update page start address registered in the update area start address 603 in FIG. 6 to the end page address of the PBA group.

In the example of FIG. 8, the number of items of each of the update area pages (the number of items in a row direction) represents the management information that is changed dynamically according to the registered value of the update area start address 603 of the address conversion management information 600 but may, on the other hand, be managed by the management information of a fixed size which registers each of the update area addresses in place of the update source address. In this case, the management information size can be reduced in a PBA group for which the compression effect is large (for example, if the update area is greater than the base area in the compressed data).

The update area address 801 is an item for registering the start address of the physical pages 405 to 407 of the update area 430 shown in FIG. 4 and the update area pages 705 to 707 shown in FIG. 7, and registers the start addresses of each of the pages consecutively beginning with the start pages of the update areas 430 and 730. Note that update area addresses 801 according to the present embodiment are registered by means of relative addresses, starting with the start address of the PBA group, but may also be managed by means of absolute addresses in the PBA space.

The update source address 802 is an item for registering the start addresses of base area pages, in an uncompressed PBA group, which are a source for updating the update data stored in each of the update pages shown in FIG. 4 (physical pages of the update area 430) 405 to 407.

In addition, the update source address 802 in a compressed PBA group is an item for registering the start addresses of the pages in the compressed-data base area pages 711 to 715 stored in the compressed base area pages 701 to 704 which are a source for updating the update data stored in each of the update area pages 705 to 707 shown in FIG. 7.

The update area management information 800 records update-source base area pages for each of the update area pages and, in the conversion of LBA and PBA during referencing, is able to acquire the addresses of update area pages in which update data is stored by searching for base area pages, indicated by the PBA calculated from the LBA, from the update source addresses 802 of the update area management information 800.

In addition, when a plurality of updates are performed on the same base area page, because update data for a plurality of identical base area pages is stored in the update areas 430 and 730, a plurality of start addresses of the same base area page are registered in the update source address 802 item in the update area management information 800. However, in the flash memory 209, because the programmed order of pages is prescribed, a data update which is generated in the same PBA group stores update data in order starting with the page with the smallest update area address. The latest update data of the base area pages is therefore stored in update area pages with large start addresses.

For this reason, the processor 203 is able to acquire the update area pages storing the latest update data by searching for the BA of the physical pages 711 to 712 of the compressed-data base area or the physical pages 401 to 404 of the base area 420 to which the LBA corresponds in order starting with the update area page with the largest physical address registered in the update area address 801.

For example, in the example shown in FIG. 8, two pages, namely 0x78000 (Page 60) and 0x7C000 (Page 62) among the update area addresses 801, store update data of the compressed-data base area 0xC0000 (Page 6). When, on these two update area pages which record update data of the same compressed-data base area, two update area addresses 0x78000 (Page 60) and 0x7C000 (Page 62) are compared, 0x7C000 has a larger address and hence it can be determined that a page with the latest area address 0x7C000 (Page 62) stores the latest update data of the compressed-data base area 0xC0000 (Page 6).

Thus far, the address conversion management information 600 and update area management information 800 according to the first embodiment have been described. By performing the address conversion management according to the present embodiment, a change in the stored data size as a result of data compression is handled by changing the number of pages assigned to the update area, and the number of pages assigned to the update area can be increased.

In the flash memory 209, which does not allow data overwrites, although erase operations are inevitably generated when the area for writing update data is exhausted as a result of data updates, by increasing the size of the update area, the number of erases generated by fixed-volume data updates can be reduced. As a result, deterioration of the flash memory 209 is alleviated and a longer operating life is achieved for the storage system.

Furthermore, according to the present embodiment, correspondence between the LBA and compressed data is managed within the flash modules and write data can be compressed or compressed data can be read without the awareness of the higher-level storage controllers 121 to 123.

The read/write operations of the flash modules which use the management information will be described next. According to the present embodiment, data compression is performed on write data from higher-level devices (hosts) 103 and the compression effect is determined. If the compression effect is equal to or more than an expected value, the compressed data is stored and when the compression effect is below the expected value, the uncompressed data is stored. As a result of this function, a drop in the performance as arises when compressed data is read is reduced by compressing only suitable data for which there is a compression effect.

Figure 9:
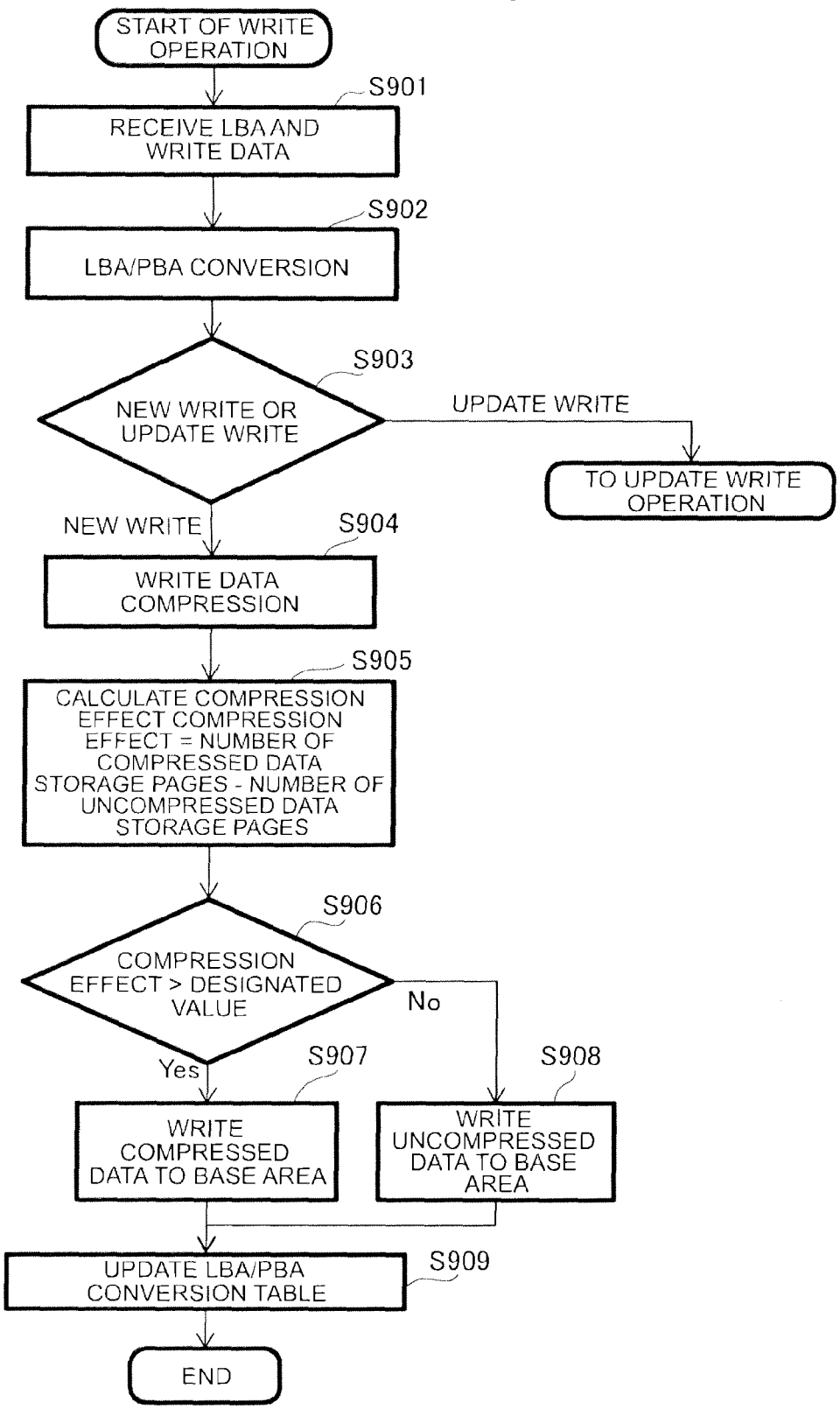
FIG. 9 shows a flowchart illustrating an update write operation according to the first embodiment.

FIG. 9 is a flowchart of a write operation according to the present embodiment. The write operation to the flash module 110 will be explained next using FIG. 9.

In the first step S901 of the write operation, the disk interface 207 of the flash module 110 receives a write request, which is transferred from the storage system 101 via the disk interface 107 of the storage controller 121, as well as an LBA designating the storage point, and write data.

At this time, the disk interface 207, which has received the write request, notifies the processor 203 that the write request has been received. This notification may be an interrupt notification to the processor 207 by the disk interface 207. In addition, instead of the disk interface 207 notifying the processor 203 that the write request has been received, the processor 207 may monitor the disk interfaces 107 at regular intervals to detect that a data write request has been received by the disk interface 207.

if notification is received from the disk interface 107 or the disk interface 107 receives a data write request, the processor 203 acquires the size of the write data and the LBA designating the write target from the disk interface 207 and reserves the write data storage area in the data buffer 206. Thereafter, the processor 203 designates the write data storage area of the data buffer 206 and instructs the disk interface 207 to perform the write data transfer. The disk interface 207 which receives the instruction from the processor 203 transfers the write data received from the higher level device to the write data storage area in the data buffer 206 indicated by the processor 203.

In the subsequent step S902, the processor 203 searches for the corresponding LBA group from the item LBA group address 601 in the address conversion management information 600 shown in FIG. 6 based on the acquired LBA and acquires registration information of the PBA group address 602 assigned to the LBA group.

If the registration value of the PBA group address 602 indicates a significant PBA group, that is, if the address corresponding to the address registered in the item LBA group address 601 is registered in the item PBA group address 602, since data is already stored on the physical page which is to serve as the write target, the processor 203 specifies the request-target PBA group from the acquired information for an update write and converts the LBA to a PBA. Here, the processor 203 specifically calculates the PBA by finding an LBA relative address in the LBA group from the difference between the LBA and the start address of the corresponding LBA group, and then adding the start address of the PBA group to the LBA relative address.

Meanwhile, if the registered value of the PBA address 602 is unassigned, the processor 203 reserves an unwritten PBA group for a new write, acquires the start address of the reserved PBA group and converts the LBA assigned to the LBA group into PBA.

In step S903, the processor 203 discriminates new writes and update writes. If a new write is determined in the preceding step 902, the processing advances to step S904. If, on the other hand, an update write is determined in preceding step S902, the processing advances to the update write flow.

In step 904, the processor 203 reserves, as processing to compress the write data, a compressed data storage area of the same size as the reception data storage area reserved in S901 in the data buffer 206.

The processor 203 then designates the start address and area size of the write data storage area storing the write data and the start address of the compressed data storage area in S901 in the data buffer 206 in the data compress/decompress unit 205, and issues a compression instruction.

After receiving the instruction, the data compress/decompress unit 205 reads data in an amount equal to the area size from the start address of the write data storage area designated in the data buffer 206 and performs data compression on the read data. Thereafter, the data compress/decompress unit 205 writes the compressed data generated by the compression in the compressed data size from the start address of the compressed data storage area designated in the data buffer 206 and notifies the processor 203 of the data size of the compressed data.

In step S905 which follows, the processor 203 calculates the compression effect. According to the present embodiment, the system administrator is able to optionally select the desired compression effect via the management screen 1550 shown in FIG. 15 and the compression effect can be selected in physical page size units which are the minimum write units of the flash memories 209 to 217.

In S905, the processor 203 calculates the number of pages (number of compressed-data storage pages) required for storage from the compressed-data data size indicated by the data compress/decompress unit 205 in step 905. The processor 203 then calculates the number of pages required for storage (the number of uncompressed data storage pages) from the write-data data size received from the higher-level storage controller 121. Here, the processor 203 finally calculates the difference between the number of compressed-data storage pages and the number of uncompressed-data storage pages and takes this difference as the compression effect.

in step S906, the processor 203 determines, based on the compression effect calculated in the preceding step S905, which of the compressed data and uncompressed data of the flash memory 209 is to be written to the flash memory 209.

Figure 15:
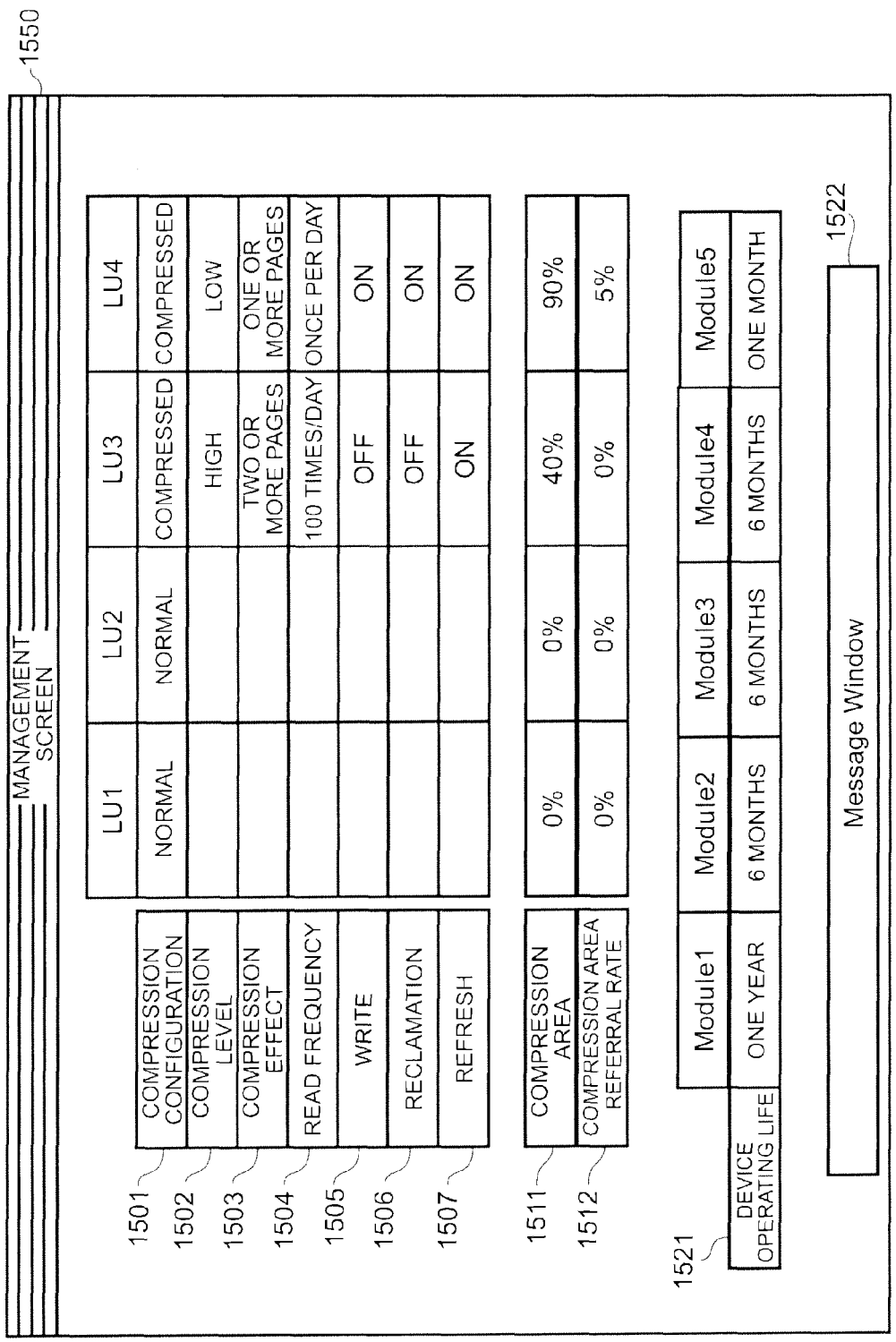
FIG. 15 shows a configuration diagram of a management screen of a storage device to which the present invention is applied.

Here, if the compression effect acquired in S905 is greater than a designated value (the designated number of pages) designated by the system administrator via the management screen 1550 shown in FIG. 15, the processor 203 moves to step S907 and writes the compressed data to the base area 720 of the corresponding PBA group.

In specific terms, the processor 203 designates the data size of the compressed data and the start address of the compressed-data storage area in the data buffer 206 for the flash memory interface 208, designates the start address of the PBA group as the PBA, and instructs a data write to the flash memory 209. Thus instructed by the processor 203, the flash memory interface 208 calculates the flash memory number, the physical block number, and the physical page number from the designated PBA and data size and specifies all the physical pages which are write targets.

Subsequently, the flash memory interface 208 reads data from the compressed-data storage area of the data buffer 206 and then writes compressed data to all the write target pages.

On the other hand, if the compression effect acquired in S905 is smaller than the designated value, the processor 203 discards the compressed data generated in S904, and releases a compressed data storage area in the data buffer 206, and then moves to step S908 and writes uncompressed write data to the PBA group base areas.

In specific terms, the processor 203 designates, in the flash memory interface 208, the start address of the write data storage area in the data buffer 206 (write data storage area which stores data from the disk interface 207 in S901) and the write-data data size, designates the start address of the PBA group as the PBA, and instructs a data write to the flash memory 209.

Thus instructed by the processor 203, the flash memory interface 208 calculates the flash memory number, the physical block number, and the physical page number from the designated PBA and data size and specifies all the physical pages which are write targets.

Subsequently, the flash memory interface 208 reads data from the reception data storage area of the data buffer 206 and then writes uncompressed write data to all the write target pages.

In step S909, at the end of the write operation, the processor 203 updates the address conversion management information 600 after writing compressed data (S907) or writing uncompressed data (S908) in the flash memory 209.

In the case of compressed data writing, the processor 203 registers the start address of the PBA group assigned to the item PBA 602 of the LBA group in the address conversion management information 600, registers the address of the next page of the pages storing the compressed data in each of the items update area start address 603 and next-write address 604, and sets a compression flag 605. At this time, since the stored data is cut from the LBA group size, if the compression effect is adequate, the value of the update area start address (page number) is small in comparison with the uncompressed PBA group storing the same volume of data, and the number of physical pages assigned to the update area 730 can be increased.

On the other hand, in the case of uncompressed data writing, the processor 203 registers the start address of a newly assigned PBA group to the item PBA group address 602 of the LBA group in the address conversion management information 600, registers the address of the next page of the pages storing the data in each of the items update area start address 603 and next-write address 604, and clears the compression flag 605.

Figure 10:
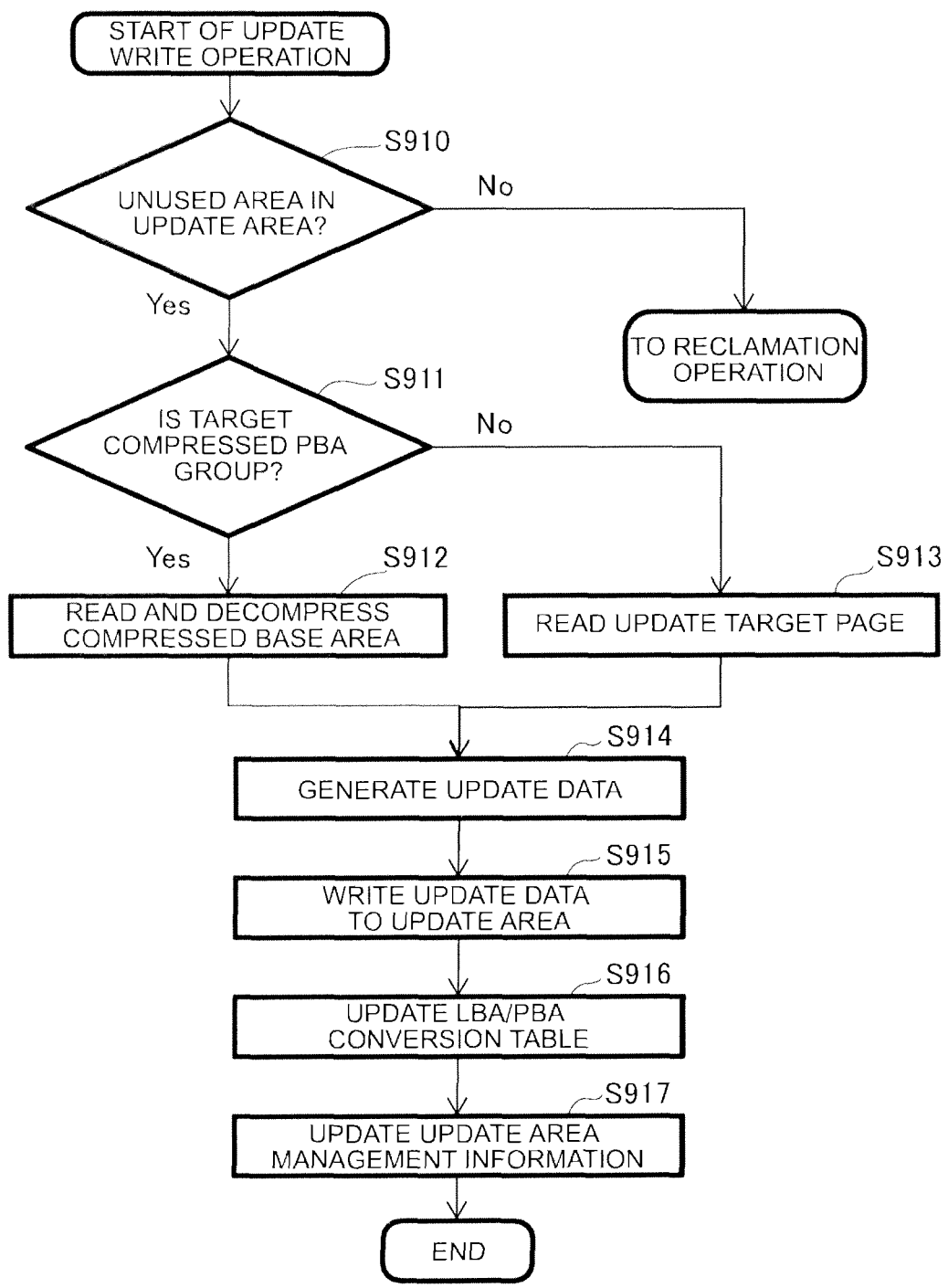
FIG. 10 shows a flowchart illustrating an update write operation according to the first embodiment.

The description thus far has included new write operations to which a compression feasibility determination for the compression effect of the flash module 110 is applied. An update write operation when an update write is determined in step S903 will be described next using FIG. 10.

An update write according to the present embodiment does not entail writing to base area pages indicated by PBAs assigned to LBAs or to compressed-data base area pages but instead re-converting PBAs and writing data to update areas.

More specifically, data which is stored on update-source base area pages or compressed-data base area pages is read to the data buffer 206, overwriting of the write data is executed on the data buffer 206, and update data of the physical page size is created. Thereafter, the created update data is written to the update area page of the PBA group in the flash memory by the flash memory interface 208.

Here, for a data update to the compressed-data base area, processing must be performed to read the compressed base area to the data buffer 206, decompress the data on the data buffer 206, and acquire data stored on the compressed-data base area pages. This processing will be described in detail hereinbelow.

Step S910 is a step in which a search for physical pages for writing an update write is performed. In step S910, the processor 203 refers to the address conversion management information 600 and acquires a registered value of the item next-write address 604 of the LBA group to which the LBA pertains. When the acquired next-write address indicates that the update area 730 is exhausted, that is, if the acquired next-write address is the last page of the update areas 430 and 730, because unwritten area does not exist in the update areas 43- and 730, the address processor 203 advances to a reclamation operation in order to newly reserve the update areas 430 and 730.

Meanwhile, if the acquired address is not the address of the last page of the update area 730, the processor 203 determines that an update write can be made to the update area page indicated by the acquired address, and moves to step S911.

In step S911, it is examined whether the target destination PBA group for performing the data update is a compressed PBA group. In specific terms, the processor 203 refers to the address conversion management information 600 and acquires a registered value of the item compression flag 605 of the LBA group to which the LBA pertains. If the acquired value is 1, this signifies that the update write is to a compressed PBA group and the processor 203 moves to the next step S912.

If, on the other hand, the acquired value is 0, this signifies that the update write is to an uncompressed PBA group and the processor 203 moves to the next step S913.

In step S912, at the time of the data update to the compressed PBA group, the processor 203 reads the compressed base area 720 and decompresses the read data in order to update the page in the compressed-data base area.

More specifically, the processor 203 first reserves an area (hereinafter also referred to as the compressed data storage area) for storing data of the compressed base area 720, and an area for storing decompressed data (hereinafter also referred to as the decompressed data storage area), in the data buffer 206.

The processor 203 subsequently instructs the flash memory interface 208 to perform reading by designating the PBA group start address as a PBA and designating the data size of the compressed data and the start address of the compressed-data storage area in the data buffer. Thus instructed by the processor 203, the flash memory interface 208 calculates the flash memory number, the physical block number, and the physical page number from the designated PBA, reads the compressed data stored in the compressed base area, and writes the compressed data thus read to the compressed-data storage area in the data buffer 206.

The processor 203 then instructs the compress/decompress unit 205 to perform decompression by designating the start address and area size of the compressed-data storage area and the start address of the decompressed data storage area in the data buffer 206. After receiving the instruction, the data compress/decompress unit 205 reads data in an amount equal to the area size from the start address of the compressed base data storage area designated in the data buffer 206 and performs data decompression on the read data. Thereafter, the data compress/decompress unit 206 writes the decompressed data generated by the decompression in the decompressed data size from the start address of the decompressed data storage area designated in the data buffer 206 and notifies the processor 203 of the data size of the decompressed data.

The processor 203 then calculates the address for storing an update target page from the start address of the decompressed data storage area.

In S913, when a data update is made to an uncompressed PBA group, data of the base area page storing the previous update-source data is read in order to update the base area page.

More specifically, the processor 203 first reserves the previous data storage area in the data buffer 206. The processor 203 subsequently instructs the flash memory interface 208 to perform reading by designating the PBA group start address as a PBA and designating the data size of the base area and the start address of the previous-data storage area in the data buffer 206. Thus instructed by the processor 203, the flash memory interface 208 calculates the flash memory number, the physical block number, and the physical page number from the designated PBA and specifies the physical pages which are update write targets.

Subsequently, the flash memory interface 208 reads the previous data stored in the base area page and writes the data in the previous data storage area of the data buffer 206.

In S914, the partial data which is required for the previous data of the update target page is updated and page-unit update data which is written to the flash memory is generated.

More specifically, the processor 203 reserves a storage area for the update data in the data buffer 206. Subsequently, in step S912 or step 913, by overwriting the update source data read from the flash memory 209 with received data from the storage controller 121 which was stored in S901, the processor 203 generates update data and writes the generated update data to the update data storage area in the data buffer 206.

In the next step S915, the update data generated in the preceding step S914 is written to the flash memory 209.

More specifically, the processor 203 instructs the flash memory interface 208 to perform writing by designating the registration address of the next page address item in the PRA group as a PBA and designating the update data size and the start address of the update data storage area in the data buffer. Thus instructed by the processor 203, the flash memory interface 208 calculates the flash memory number, the physical block number, and the physical page number from the designated PBA and specifies the update area pages which are write targets.

Subsequently, the flash memory interface 208 reads update data from the update data storage area in the data buffer 206 and then writes the update data thus read to the specified update area pages.

In step S916, the access conversion management information 600 is updated after data writing to the flash memories 209 to 217.

More specifically, the processor 201 registers the next-write address 604, of the address conversion management information 600 in the LBA group to which the LBA pertains, in the PBA representing the next page of the pages written with update data in the preceding step S915. Note that if the page written with the update data in S915 is the last page of the PBA group, a value indicating that the update area pages are exhausted is registered.

In step S917, the address of the base area 720 or the compressed-data base area which are the update source pages is registered in the item update source address 802 which corresponds to the update area page written with update data in S915 in the update area management information 800.

The update write operation was explained hereinabove and the write operation for the first embodiment was described. Note that according to the present embodiment a write completion response to the storage controller 121 which is the write request source may be performed after the write data storage to the data buffer reception data storage area of S901 ends or after the series of write operations to the flash memory 209 as per S909 and S917 ends.

The read operation of the flash module will be described next. In the read operation according to the present embodiment, if the request-target data is stored on a compressed-data base area page, all the compressed data is read from the flash memory 209 to the data buffer 296 and after being decompressed in the data buffer 206, the data of the pages assigned to the LBA is transferred to the request-source storage controller 121.

If, on the other hand, the request-target data is stored in an uncompressed base area or update area, only the requested page is read to the data buffer 206 from the flash memory 209 and transferred to the request-source storage controller 121.

Figure 11:
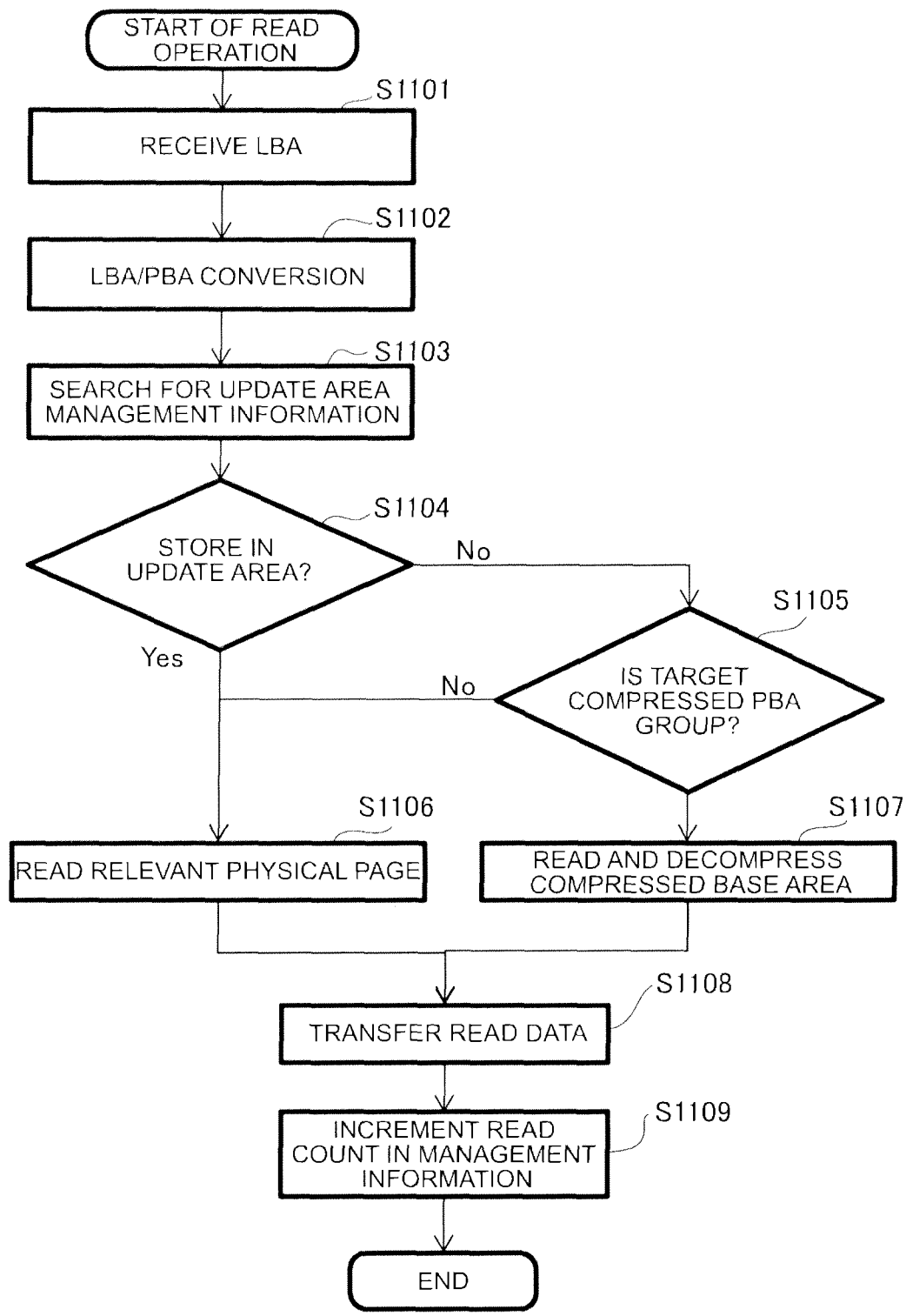
FIG. 11 shows a flowchart illustrating a read operation according to the first embodiment.

FIG. 11 is a flowchart of a read operation according to the first embodiment. The read operation of the flash module 110 will be explained using FIG. 11.

In the very first step S1101 of the read operation, the disk interface 207 of the flash module 110 receives a read request, which is transferred from the storage system 101 via the disk interface 107 of the storage controller 121, as well as an LBA designating the storage point.

At this time, the disk interface 207, which has received the write request, notifies the processor 203 that the read request has been received. This notification may be an interrupt notification to the processor 207 by the disk interface 207. In addition, instead of being alerted by this notification, the processor 207 may detect the reception of read requests by the disk interface 207 by monitoring the disk interface 107 at regular intervals.

If notification is received from the disk interface 107 or it is detected that the disk interface 107 has received a read request, the processor 203 acquires detailed information such as the read data amount and LBA of the read request from the disk interface 207.

In the subsequent step S1102, the processor 203 searches for the corresponding LBA group from the LBA group item 601 in the address conversion management information 600 shown in FIG. 6 based on the acquired LBA, acquires registration information of the PBA group item 602 of the LBA, specifies the read-target PBA group from the acquired information and converts the LBA into a PBA.

In the next step S1103, the processor 203 refers to the update area management information 800 on the PBA group acquired in the preceding step S1102 and examines whether the base area page designated by the PBA has been updated.

More specifically, the processor 203 calculates the address of the base area page or compressed-data base area page designated by the PBA from the difference between the PBA and the start address of the PBA group.

The processor 203 then searches the item update source address 802 of the update area management information 800 to determine whether the calculated page number has been registered. Here, if the calculated address has been registered in the update area management information 800, the processor 203 discriminates the read target as the update area page, however if the calculated address has not been registered in the update area management information 800, the read target discriminates the read target to be a base area page or compressed-data base area page.

In step S1104 which follows, if the read target page was stored in the update area in the preceding step S1103, the processor 203 changes the read target PBA to the update area page PBA and advances to the processing of step S1106. However, if the read target page, was not stored in the update area in step S1103, the processor 203 advances to the processing of step S1105.

In step S1105, it is examined whether the read target PBA group is a compressed PBA group or an uncompressed PBA group.

In specific terms, the processor 203 refers to the address conversion management information 600 and acquires a registered value of the item compression flag 605 of the LBA group to which the LBA pertains. If the acquired value is 1, the processor 203 determines that the read target PBA group is a compressed PBA group and advances to the processing of step S1107, but if the acquired value is 0, the read target PBA group is read as an uncompressed PBA group and the processor 203 advances to the processing of step S1106.

In step S1106, the processor 203 reads the physical page for which a PBA is designated from the flash memory 209.

More specifically, the processor 203 reserves a temporary storage area for the data read from the flash memory 209 in the data buffer 206.

The processor 203 subsequently instructs the flash memory interface 208 to perform reading by designating the PBA designating the read target page and the start address of a temporary data storage area in the data buffer 206 (a temporary storage area for temporarily storing data which is read from the flash memory 209). Thus instructed by the processor 203, the flash memory interface 208 calculates the flash memory number, the physical block number, and the physical page number from the designated PBA and specifics the physical page which is the read target.

The flash memory interface 208 subsequently reads the data stored on the read-target physical page and writes the data thus read to the temporary storage area in the data buffer 206.

In step S1107, at the time of reading data from the compressed PBA group, the processor 203 reads the compressed base area and decompresses the read data in order to read the page in the compressed-data base area.

More specifically, the processor 203 reserves an area (hereinafter referred to as the compressed data storage area) for storing the data read from the compressed base area in the data buffer 206, and reserves an area for storing decompressed data (hereinafter referred to as the decompressed data storage area).

The processor 203 subsequently instructs the flash memory interface 208 to perform reading by designating the PBA group start address as a PBA and designating the data size of the compressed data and the start address of the compressed-data storage area in the data buffer. Thus instructed by the processor 203, the flash memory interface 208 calculates the flash memory number, the physical block number, and the physical page number from the designated PBA, reads the data stored in the compressed base area of the flash memory 209, and writes the data thus read to the compressed-data storage area in the data buffer 206.

The processor 203 then instructs the compress/decompress unit 205 to perform decompression by designating the start address and area size of the compressed-data storage area and the start address of the decompressed data storage area, in the data buffer 206. After receiving the instruction, the compress/decompress unit 205 reads data in an amount equal to the area size from the start address of the compressed data storage area in the data buffer 206 and performs data decompression on the compressed base area.

Thereafter, the data compress/decompress unit 206 writes the compressed data in an amount equal to the size of the data generated by the decompression from the start address of the decompressed data storage area designated in the data buffer 206, and notifies the processor 206 of the data size of the decompressed data. The processor 207 then calculates the address for storing a read target page from the start address of the decompressed data storage area.

In S1108, the processor 207 transfers the data which was read from the flash memory 209 in S1106 and S1107 to the read request source storage controller 121.

More specifically, the processor 203 instructs the disk interface 207 of the flash memory controller 201 to perform a data transfer by designating the address of the read request target data in the temporary storage area or decompressed data storage area in the data buffer 206. Thus instructed by the processor 203, the disk interface 207 reads the data from the data buffer 206 and transfers the data thus read to the storage controller 121.

In S1109, which is the final step in the read operation, the disk interface 207 adds the number of physical pages thus read to the value of the read count item 606 of the LBA group to which the LBA pertains, in the address conversion management information 600 shown in FIG. 6, and updates the address conversion management information 600.

The read operation according to the first embodiment was described hereinabove. As a result of the read operation according to the present embodiment, the higher-level storage controller 121 is able to acquire data simply by designating the LBA and without regard for the data storage method i.e. compression or decompression in the flash memory module.

According to the present invention, the number of times the physical blocks belonging to the flash memory are erase targets can be reduced in order to provide the device with a longer operating life.

Example 2

A flash module according to a second embodiment ample 2) will be explained next. The second embodiment is the same as the first embodiment with regard to the address conversion management information (LBA/PBA conversion management information) 600, the update area management information 800, and the read/write operation of the flash module 110 and therefore an explanation of these elements is not included here.

In the second embodiment, data compression is performed in the event of data compression during a data write according to the first embodiment, but also for a reclamation operation and refresh operation. In addition, the read frequencies of the PBA group to be compressed during data compression is referred to and only those PBA groups with a low read frequency are compressed.

According to the second embodiment, the data with a high read frequency is stored in the flash memory in an uncompressed form, and a performance drop which is inevitably produced by the overhead of decompression processing when compressed data is read can be avoided. Furthermore, by referring to the read frequency in order to determine, in the event of a reclamation or refresh operation, whether or not compression will be effective, even data which has been stored in a previous compressed PBA group is changed to an uncompressed PBA group and stored, unless the read frequency is high for a fixed period. By changing the compression and non-compression of PBA groups dynamically according to the read frequency, a drop in device performance can be reduced by only storing the data with a low read frequency in a compressed form.

Hence, according to the second embodiment, as well as being able to prolong the operating life of the flash module 110 as per the first embodiment described hereinabove, it is also possible to reduce a drop in the device performance which is generated by the aforementioned overhead due to data compress/decompress computation.

Figure 12:
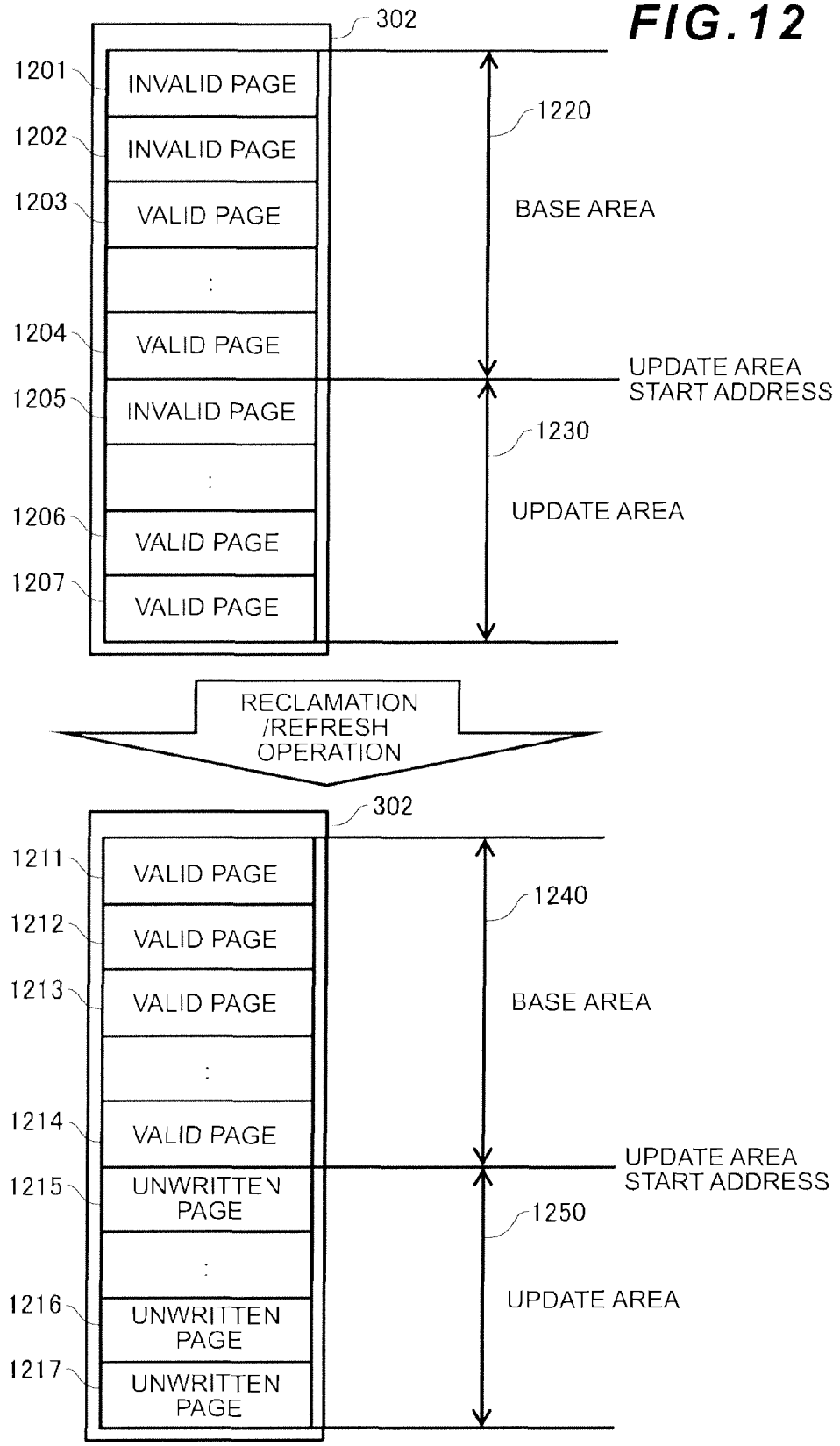
FIG. 12 shows a conceptual view of a reclamation operation according to a second embodiment.

An overview of a reclamation operation according to the present embodiment will be described hereinbelow using FIG. 12.

When the update area 1230 in a PBA group is exhausted, the PBA group includes pages 1203, 1204, 1206, and 1207, . . . (hereinafter called valid pages) which are indicated by the PBA associated with the LBA, and pages 1201, 1202, 1205, . . . (hereinafter called invalid pages) which are indicated by the PBA whose correspondence with an LBA has been canceled by a data update. At this time, the update data stored in the valid pages 1206 and 1207 in the update area 1230 is copied to the data of the base area 1220, the data of valid pages 1211 to 1214 which are all valid is newly created, and the data of the valid pages 1211 to 1214 is written to a base area 1240 of the new PBA group. An update area 1250 which comprises unwritten pages 1215 to 1217 can be reserved once again in the re-constructed PBA group. This operation is called a reclamation operation.

A new PBA group which is written to by a reclamation operation may be the same PBA group that was once erased or alternatively writing may be to a different PBA group and the address conversion management information 600 shown in FIG. 6 may be changed so that the written PBA group is associated with a new LBA group.

A reclamation operation is triggered when the processor 203 refers to the registration value of the next-write address 604 of the address conversion management information 600 shown in FIG. 6 and the registration value indicates that the update area is exhausted.

The importance of a reclamation operation and an operation overview will be described next.

The flash memories 209 to 217 record data as a result of electrons being applied to and retained by a floating gate which is isolated by an oxidized insulation film. However, it is known that, as time elapses, electrons gradually drain from the oxidized insulation film and the recorded data is ultimately lost, and the data protection term of the flash memories 209 to 217 is limited.

Therefore, in a semiconductor storage device requiring long-term data protection, the same data can be saved for a long time by writing the data to the flash memory and then rewriting data that has been stored for a definite period by means of a refresh operation.

A refresh operation is essentially the same operation as the aforementioned reclamation operation. However, whereas a reclamation operation targets PBA groups with exhausted update areas, a refresh operation targets PBA groups for which a definite period has elapsed since data was stored. Hence PBA groups with a stochastically low update frequency which have not been subjected to a reclamation operation for a definite period are refresh operation targets.

For this reason, in compression which is triggered by a refresh operation, PBA groups with a low update frequency are in principle selected and targeted for compression. By compressing data with a low update frequency, the frequency with which a performance drop occurs as a result of the overhead from the reading and decompression of compressed data at the time of an update can be reduced.

The writing of a refresh operation according to the present embodiment may also be to the same PBA group that was once erased or alternatively writing may be to a different PBA group and the address conversion management information 600 may be changed so that the written PBA group is associated with a new LBA group.

In the second embodiment, erase management information 1300, which is shown in FIG. 13, is used during the protection term in order to determine the trigger for the refresh operation.

FIG. 13 shows the configuration of erase management information according to the present embodiment. As shown in FIG. 13, the erase management information 1300 includes at least such items as a PBA group start address 1301, an erase count 1302, and a previous erase date and time 1303, and information of each of these items is registered for each PBA group. Furthermore, the erase management information 1300 is stored in the RAM 204 in the flash memory controller 201 in FIG. 2 and is referred to and updated by the processor 203.

The PBA group address 1301 is an item which records the start addresses of all the PBA groups 511 to 515 shown in FIG. 5.

The erase count 1302 is an item for recording the cumulative number of erases for each PBA group. PBA groups with an erase count which is equal to or more than a fixed value are determined as being wholly unreliable in their data retention capability and are invalidated. Note that when the flash module 110 has a certain amount of invalid PBA groups or more, it is determined that the operating life of the flash module 110 is over and is rendered inaccessible.

The previous erase date and time 1303 records the closest date and time when physical blocks associated with each of the PBA groups 511 to 515 are erased. The processor 203 regularly acquires the registration values of the previous erase date and time 1303 for each of the PBA groups 511 to 515 and starts a refresh operation to PBA groups for which a time interval equal to or more than a prescribed value has elapsed since the previous erase time. Prescribed values for refresh intervals are typically prescribed by flash memory vendors.

Thus far an overview of the reclamation and refresh operations according to the second embodiment which are performed in LBA and PBA group units has been provided together when an explanation of the triggers for these operations. The reclamation operation and refresh operation to which the present embodiment is applied will be described in detail hereinbelow using FIG. 14.

In step S1401, which is the first step of the reclamation and refresh operations, the target PBA group on which a reclamation or refresh operation is to be performed is examined to distinguish the PBA group as a compressed PBA group or an uncompressed PBA group.

In specific terms, the processor 203 acquires a registration value of the item compression flag 605 of the LBA group in the address conversion management information 600. If the acquired value is 1, the processor 203 determines that the target PBA group is a compressed PBA group and advances to the processing of step S1402, but if the acquired value is 0, the target PBA group is determined to be an uncompressed PBA group and the processor 203 advances to the processing of step S1406.

When it is determined in step 1402 that the target PBA group of the reclamation or refresh operation is a compressed PBA group, the data in the compressed base area is read from the flash memory 209 and decompressed in order to read valid page data of the compressed-data base area. The specific operation is the same as step S1107 in FIG. 11 and will not be described here.

In step S1403 which follows S1402, valid pages are acquired from the compressed-data base area which was read from the flash memory 209 and decompressed in the preceding step S1402.

More specifically, the processor 203 refers to the update area management information 800 of the target PBA group, acquires, as valid pages, all the compressed-data base area pages for which the start address has not been registered as the update source address 802 and, after acquiring these pages, advances to the next step S1404.

In step S1404 which follows S1403, the valid pages of the update area are read from the flash memory 209.

More specifically, the processor 203 refers to the update area management information 800 of the target PBA group, examines all the pages in order, starting with the update area page for which the update area address 801 is largest, and reads the valid pages. The details of this operation are substantially the same as step S1106 in FIG. 11 and will therefore not be described here.

In step S1405 which follows S1404, the processor 203 integrates the valid pages of the compressed-data base area and update area, which were acquired in each of the steps S1403 and S1404, in the data buffer 206 in the order of the PBA addresses in the PBA groups, and generates the latest base area data of the same size as the base area.

When it is determined in step S1406 that the target PBA group of the reclamation or refresh operation is an uncompressed PBA group, the valid page data of the base area is read and therefore the base area is read from the flash memory.

More specifically, the processor 203 refers to the update area management information 800 of the target PBA group, reads, as valid pages, all the base area pages for which the start address has not been registered as the update source address 802 and, after reading these pages, advances to the next step S1406.

In step S1407 which follows S1406, the valid pages of the update area are read from the flash memory 209. The operation is essentially the same as S1404 and will not be described here.

In step S1408 which follows S1407, the processor 203 integrates the valid pages of the base area and update area, which were acquired in each of the steps S1406 and S1407, in the data buffer 206 in the order of the PBA addresses in the PBA groups, and generates the latest base area data.

In step S1409, the processor 203 examines the read frequency of the target PBA groups of the reclamation or refresh operation, and carries out a reclamation or refresh operation without performing compression for the LBA groups with a high read frequency. In addition, for LBA groups with a low read frequency, the processor 203 executes compression processing, and carries out a reclamation or refresh operation.

As a result of step S1409, the flash module 110 is able to avoid compressing data with a high read frequency and thereby reduce the drop in device performance which occurs due to the decompression processing overhead generated when referring to compressed data.

The specific operation in step S1409 will be described hereinbelow. The processor 203 refers to the read counts 606 in the address conversion management information 600 of FIG. 6 and acquires the read count registered for the LBA group which is a reclamation or refresh target. If the acquired read count is numerically smaller than a designated value, the processor 203 determines that the PBA group is a PBA group with a low read frequency, and advances to the processing of the next step S1410 in order to perform compression.

On the other hand, if the read count is numerically larger than the designated value, the processor 203 determines that the PBA group is a PBA group with a high read frequency, and advances to the processing of the next step S1414 in order to write the data as uncompressed data.

Figure 14:
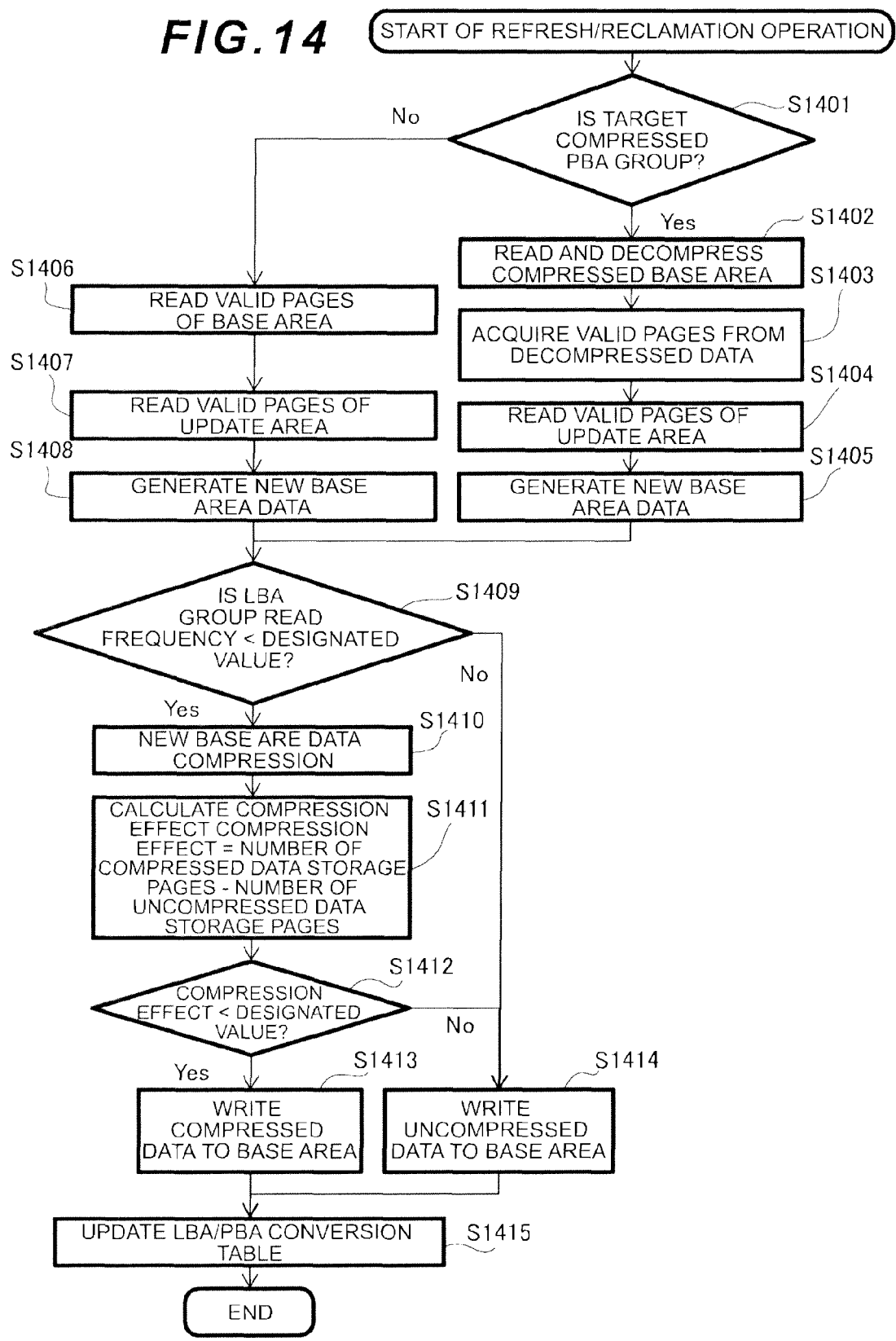
FIG. 14 shows a flowchart illustrating a reclamation/refresh operation according to the second embodiment.

The operation in each of the steps S1410 to S1415 shown in FIG. 14 is the same as that of S904 to S909 shown in FIG. 9. However, whereas write data is a compression target in each of the steps of S904 to S909, in each of the steps S1410 to S1415, new base area data generated in S1408 or S1405 is taken as the compression target. Since a description of the specific operation would only differ with regard to the compression target, a description is not included.

As a result of the processing of each of the above steps, according to the present invention, compression of the stored data is triggered by a reclamation operation or refresh operation.

Management of the compression conditions is performed as a result of the system administrator operating the management console 104. The management console 104 monitors the information in the flash module 110 at regular intervals via the storage controller 121 and controls the flash module 110 by transferring information such as commands.

FIG. 15 is an example of a management screen which is displayed on the management console 104. The management screen 1550 shown in FIG. 15 comprises, as entry items that the system administrator configures for each LU, a compression configuration 1501, a compression level 1502, a compression effect 1503, a read frequency 1504, a write 1505, reclamation 1506, and refresh 1507, as well as a compression area 1511 which displays the status of each LU, and a compressed area referral rate 1512. When the system administrator configures each LU, compression processing is performed in each case according to the LU configuration for the PBA assigned to the LBA in the LU.

The compression configuration 1501 is an entry item for configuring whether compression is necessary for each LU; compression is not performed for LUs which are configured as normal. In addition, LUs configured for compression are subjected to compression according to the conditions of the other entry items 1502 to 1506.

Typically, compression/decompression processing requires a certain calculation time, and referring to the compressed data takes longer than referring to uncompressed data, and performance drops. Using these items, device performance can be flexibly configured for each LU depending on the demands of the system administrator so that LUs requiring high performance are uncompressed and LUs not requiring high performance are compressed.

The assignment of each of the LUs and LBA groups is designated by the storage system 101 and the flash module 110 manages this assignment of designated LUs and LBA groups and performs each of the compression operations at the time of a write, reclamation or refresh only for those LBA groups which are assigned to the LU configured for compression.

Furthermore, although not shown in FIG. 15 for the sake of simplicity, various compression-related configurations like those for the LU can also be made for each flash module, independently from the LU configurations.

The compression level 1502 is an entry item for configuring the strength of data compression for LUs for which the compression configuration 1501 is configured as compression.

More specifically, optimization processes for compression algorithms and data compression are configured. Compression algorithms include a compression algorithm for a high compression rate but long computation time and a compression algorithm for a low compression rate but short computation time. Even with an identical compression algorithm, the compression rate and the time required for the compression/decompression calculation varies depending on the arithmetic units and so on configured. For LUs for which this item is configured as High, an algorithm or compression calculation with a long calculation time but high compression rate is configured.

On the other hand, for LUs for which this item is configured as Low, an algorithm or compression calculation with a short calculation time but low compression rate is configured. Note that instead of the configuration items High and Low, other possible configurations include the designation of the algorithm installed in the compress/decompress units 205 and a search range in the compression calculation and so on. The system administrator is able to use these items to flexibly configure a balance between device performance and the device operating life.

The compression effect 1503 is an entry item for configuring a condition for determining whether compression is required for each of the data in the LUs for the LUs for which the compression configuration 1501 is configured as Compression. More specifically, this item is employed as the compression requirement determination condition for step S906 shown in the flowchart of FIG. 9 and step S1412 shown in the flowchart of FIG. 14.

The system administrator is able to use these items to avoid data compression which has a low effect, control the proportion of compressed areas, and flexibly configure a balance between device performance and the device operating life. Note that if the set value is zero page, even update area expansion is infeasible because the compression effect becomes less, it is possible to have a prolonged device operating life which is achieved by embedding suitable data in a unwritten area created by the data compression.

The read frequency 1504 is an entry item for configuring conditions for PBA groups which are compression targets in LUs whose compression configuration 1501 is Compression and whose reclamation 1504 or refresh configuration 1505 is configured as ON. More specifically, this item is employed as the compression requirement determination condition in step S1409 of FIG. 14. Using these items, compression of PBA groups with a high read frequency can be avoided, a drop in device performance which is produced by decompression processing during reading can be reduced, and the balance between device performance and operating life desired by the system administrator can be flexibly configured.

The write 1505 is an entry item for configuring the requirement for compression as triggered by a write operation in LUs for which the compression configuration 1501 is configured as Compression. LUs for which write 1505 is configured as ON execute the compression write flow shown in FIG. 9, for example, in which data compression is performed during writing.

However, LUs for which write 1505 is configured as OFF always perform an uncompressed write operation, with data compression not being triggered by write operations. Using this item, the system administrator is able to configure whether compression is triggered by a write operation and, by invalidating write-triggered compression, adopt a configuration which prioritizes write performance.

The reclamation 1506 is an entry item for configuring the requirement for compression as triggered by a reclamation operation LUs for which the compression configuration 1501 is configured as Compression. LUs for which the reclamation 1506 are configured as ON execute the reclamation operation shown in FIG. 14.

On the other hand, LUs for which the reclamation 1506 is configured as OFF always perform an uncompressed reclamation operation, with compression triggered by reclamation not being performed.

The refresh 1507 is an entry item for configuring the requirement for compression as triggered by a refresh operation in LUs for which the compression configuration 1501 is configured as Compression. LUs for which the refresh 1507 is configured as ON execute the refresh operation shown in FIG. 15.

On the other hand, LUs for which the refresh 1507 is configured as OFF always perform an uncompressed refresh operation, with compression triggered by a refresh not being performed.

Thus far, entry items for compression configuration which are configurable by the system administrator have been described. Display items for compression-related device states will be described next.

The compression area 1511 is a display item which shows the ratio of compressed areas to the total LU area for each LU.

More specifically, the processor 203 refers to the address conversion management information (LBA/PBA management information) 600 and acquires by way of calculation the percentage of the number of compressed PBA groups among all the PBA groups. As a result of these display items, the system administrator is able to find out the percentage of the compressed area in the LU, according to the aforementioned entry items 1501 to 1507.

The compressed area referral rate 1512 is a display item for displaying the access frequency to compressed data for LUs for which the compression configuration 1501 is configured as Compression.

More specifically, the processor 203 refers to the address conversion management information (LBA/PBA management information) 600 and, by referring to the read count 606 after specifying the compressed PBA group, acquires by way of calculation the percentage of the number of reads to the compressed PBA groups with respect to the number of reads to all the PBA groups. As a result of these display items, the system administrator is able to find out the rate of referral to the compressed data in the LU, according to the aforementioned entry items 1501 to 1507, and indirectly identify the effect on device performance.

The device operating life 1521 is an area indicating the remaining device operating life as acquired from the flash module 110. The device operating life is calculated from the remaining number of times that the flash memories 209 to 217 can be erased and the amount of write data in a definite period. Using these items, the system administrator is able to identify a flash module 110 with a short operating life, for example, perform configuration to increase the data compression area of the flash module 110 and so forth, and thus extend the device operating life.

The message display area 1522 is an area which displays information acquired from the flash module 110 such as, for example, the maximum number of erases of the physical blocks 302, the distribution of the erase count, and the number of physical blocks which cannot be used.

As explained thus far, the system administrator is able to control the compression operation, while acquiring the status of the flash module 110 using the management screen 1550 displayed on the management console 104, whereby a prolonged device operating life combined with a minimized drop in device performance is achieved.

Example 3

In the first and second embodiments, the LBA and PBA are managed separately with areas of a fixed size serving as the LBA groups and areas of the physical block size serving as PBA groups, and optional PBA groups are assigned to the LBA groups However, in the third embodiment (Example 3), an example is shown in which the physical page size units which are the minimum read/write units of the flash memory are managed separately as LBA Pages and PRA Pages, optional PBA Pages are assigned to the LBA Pages, and data compression is applied to this address conversion management configuration.

The third embodiment is the same as the first embodiment and second embodiment with regard to device configuration and erase management information, therefore a description is omitted.

Figure 16:
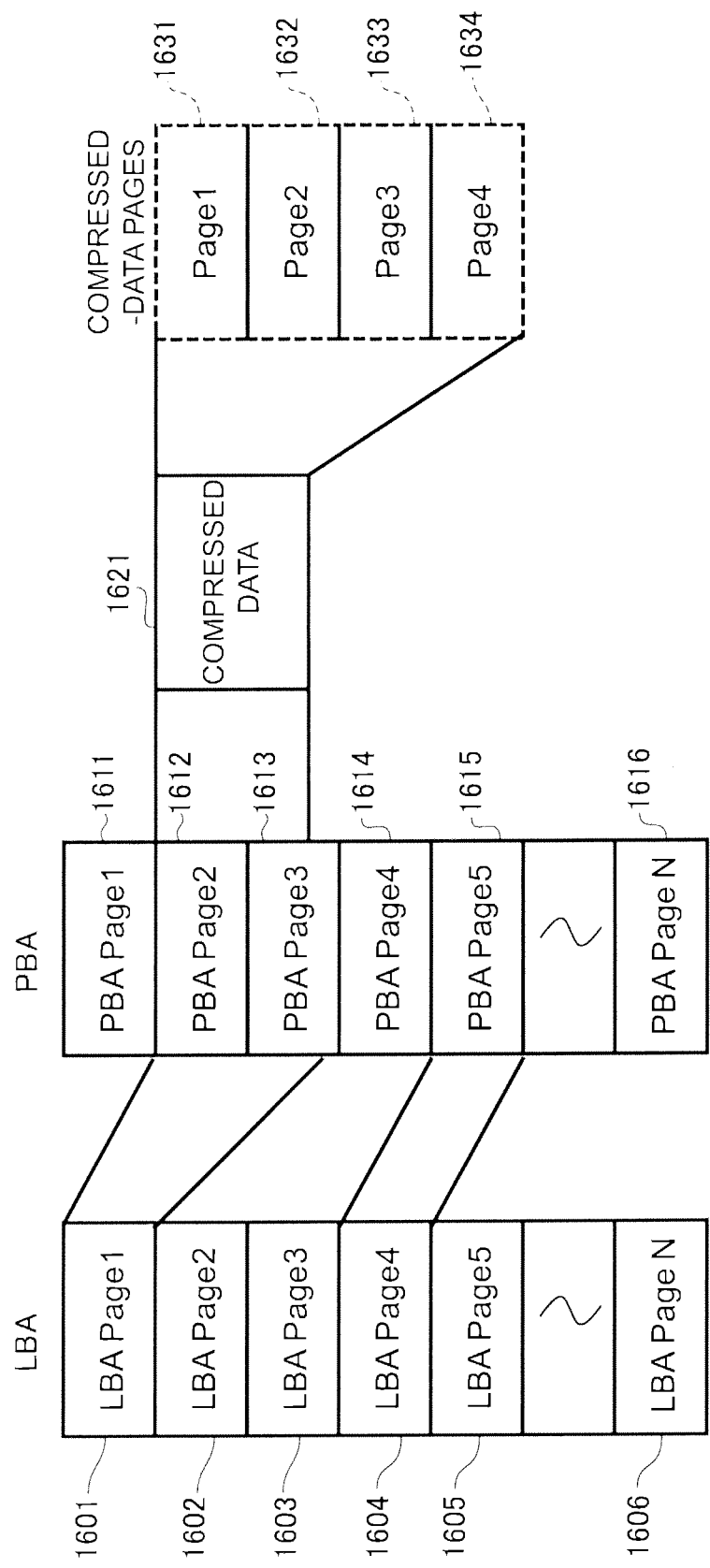
FIG. 16 shows a conceptual view of address conversion according to a third embodiment.

FIG. 16 is a conceptual view which conceptually shows correspondence between an LBA space and PBA space according to the third embodiment.

As shown in FIG. 16, in the third embodiment, the LBA space to which the storage controller 121 refers is managed by being divided into physical page sizes as LBA pages 1601 to 1606. The LBA Pages are virtual areas obtained simply by dividing the LBA space into physical page sizes.

Furthermore, the PBA space is likewise managed by being divided into physical page sizes as PBA Pages 1611 to 1616. Physical pages of the same size are associated with the PBA Pages 1611 to 1616.

Information on chips with the initial number of the flash memories 209 to 217 where the flash module 110 is installed is associated with each of the PBA Pages 1611 to 1616 of the PBA space. In other words, the PBA Pages 1611 to 1616 of the PBA space are each associated with the PBA such that all the pages of the flash memories 209 to 217 are consecutive in the order of the physical page numbers, starting with the leading physical page with the leading physical block number of the flash memories 209 to 217. As a result of this association, the flash memory numbers, physical block numbers, and physical page numbers can be uniquely calculated from an optional PBA.

Furthermore, the compressed data 1621 represents compressed data which is stored on physical pages assigned to PBA Page 1612 and PBA Page 1613, for example. The compressed data 1621 is stored by batch-compressing data in an amount corresponding to the plurality of physical pages 1631 to 1634, and this virtual page will be referred to hereinbelow as the compressed data page. The compressed-data pages are each assigned to an LBA and the LBAs referred to need not be consecutive.

In the third embodiment, one PBA Page is assigned to an LBA Page which refers to uncompressed data. A LBA Page 1604, which is shown in FIG. 16, indicates an LBA which refers to uncompressed data and is assigned in a one-to-one relationship to a PBA Page 1615 of equal size.

However, in the example shown in FIG. 16, a LBA Page 1601 indicates an LBA which refers to uncompressed data and is assigned to compressed-data pages 1631 to 1634 in the compressed data 1621 which is saved spanning from PBA Page 1612 to PBA Page 1613.

In other words, an LBA which refers to uncompressed data has an LBA Page and PBA Page assigned in a one-to-one relationship and an LBA which refers to compressed data has an LBA Page assigned to two or more PBA Pages.

Address conversion management information for managing the assignment of each of the LBA pages and PBA pages shown in FIG. 16 will be described next using FIG. 17.

FIG. 17 is an example of address conversion management information 1700 according to the third embodiment. The address conversion management information 1700 shown in FIG. 17 holds such items as an LBA Page address 1701, a PBA Page address 1702, a compression flag 1703, a compressed data length 1704, a compressed-data relative address 1705, and a read count 1706, and the information of each of these items is registered for each LBA Page. Furthermore, the address conversion management information 1700 is stored in the RAM 204 in the flash memory controller 201 in FIG. 2 and is referred to and changed by the processor 203.

The LBA group address 1701 is an item which records the start addresses of all the LBA Pages 1601 to 1606 shown in FIG. 16. In FIG. 17, for example, 0x000008000, which is the start address of LBA Page 1604, is registered in the item corresponding to the LBA Page 1604 shown in FIG. 16.

The PBA Page address 1702 is an item for registering the start address of the PBA Page assigned to each of the LBA Pages. In addition, information which indicates non-assignment is registered for LBA Pages to which PBA Pages have not been assigned.

In FIG. 17, for example, 0x0000A000, which is the start address of the assigned PBA Page 1615, is registered in the item corresponding to the LBA Page 1604 shown in the example of FIG. 16.

The compression flag 1703 is an item indicating that compressed data has been assigned to the LBA Page. In FIG. 17, for example, 1 is registered in the item compression flag 1703, which indicates that, of LBA Page 1601 and LBA Page 1603, the compressed-data page in PBA Page 1613 is assigned to LBA Page 1601 and the compressed-data page in PBA Page 1612 is assigned to LBA Page 1603.

On the other hand, an uncompressed PBA Page is assigned to an LBA Page for which 0 is registered in the item compression flag 1703.

The compressed data length 1704 is an item for registering the data length of assigned compressed data on an LBA Page which has 1 registered in compression flag 1703 and to which compressed data is assigned.

The compressed-data relative address 1705 is an item for registering the relative address of the compressed data page on an LBA Page which has 1 registered in compression flag 1703 and to which compressed data is assigned.

In FIG. 17, as an example, LBA Page 1601, which has 1 registered in the compression flag 1703, registers the relative address of the compressed data page which is generated when the compressed data 1621 stored on PBA Page 1602 is decompressed. In this example, because 0x00006000 (Page 3) is registered as the compressed-data relative address 1704 of LBA Page 1601, this indicates that compressed data page 1633 has been assigned to LBA Page 1601.

Here, if compressed write data is stored on a PBA Page which is a physical page, the processor 203 forms a virtual physical page to which is assigned physical pages (compressed data pages 1631 to 1634) for storing compressed write data as data when the data is virtually decompressed, changes the corresponding relationship between an LBA Page and a PBA Page corresponding to the LBA Page into a corresponding relationship between an LBA Page and a virtual physical page and, in response to a subsequent access request, processes physical pages (compressed data pages 1631 to 1634) which are assigned to the virtual physical page as access destinations.

The read count 1706 is an item for recording the number of reads to each LBA Page. The registration value of this item is reset at optional intervals which can be configured by the system administrator and incremented by one in each read operation.

By referring to the address conversion management information 1700 hitherto described, the processor 203 converts an LBA received by the disk interface 207 into a PBA which is used when the flash interface 208 calculates the write target.

A read/write operation according to the third embodiment will be described next. First, a write operation will be described using the flowchart shown in FIG. 19.

In the third embodiment, compression is performed in the event of a write operation as per the first embodiment. However, instead of the fixed area units of the first embodiment, the third embodiment manages the corresponding relationships between the LBA and PBA in Page units. Hence, in the first embodiment, the compression targets which are combined into a single batch of compressed data are limited to LBA groups with consecutive addresses hut in the third embodiment, data with non-consecutive LBA can be compressed to form a single hatch of compressed data.

In the third embodiment, a plurality of write data with non-consecutive LBA are collected in a data buffer 206, the collected data is compressed all at once and the compression effect is determined.

In addition, the third embodiment differs from the first embodiment and second embodiment and does not possess a dedicated area which is written only during update writing such as an update area.

Figure 18:
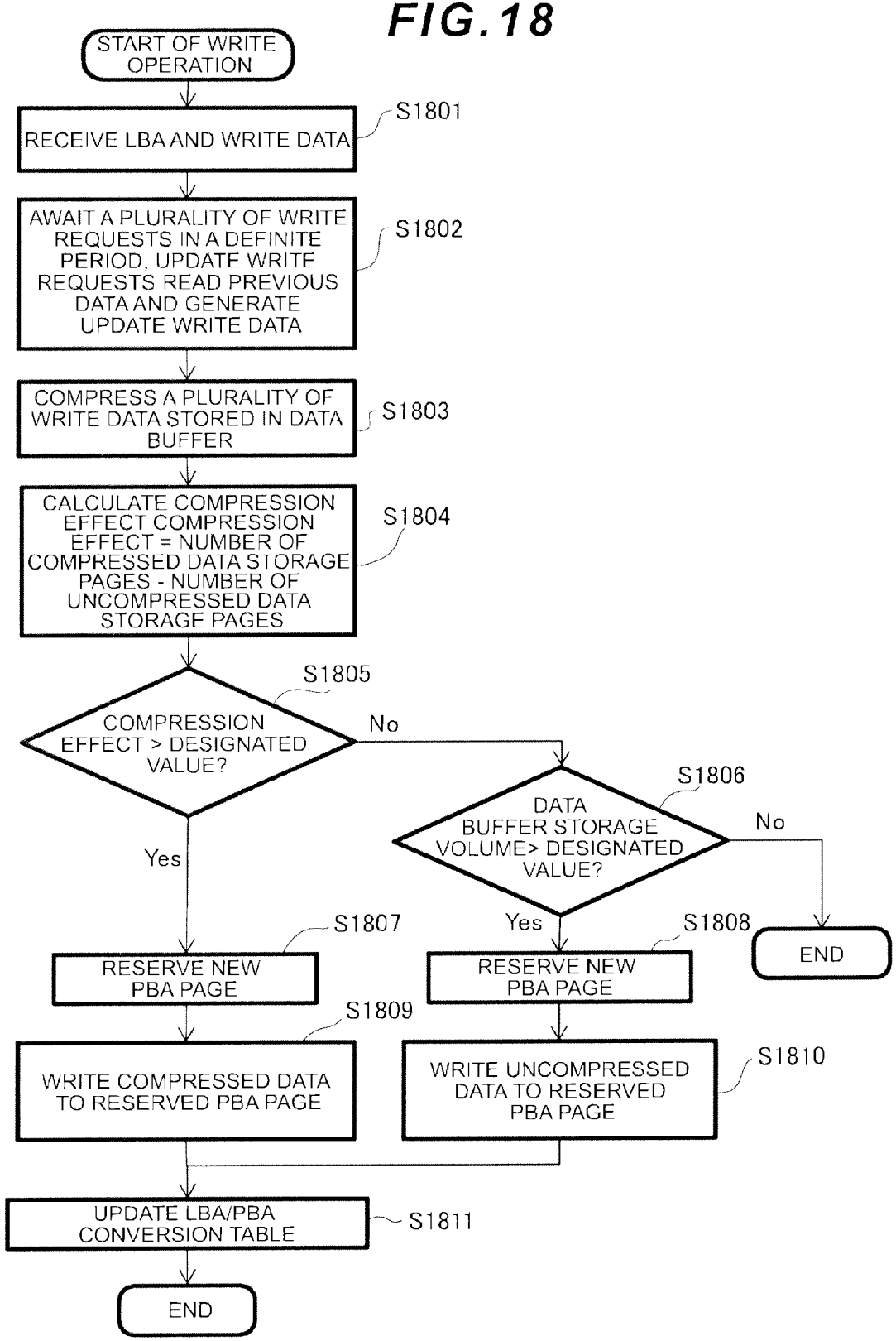
FIG. 18 shows a flowchart illustrating a write operation according to the third embodiment.

In the first step S1801 of the write operation of the third embodiment shown in FIG. 18, the disk interface 207 of the flash module 110 receives a write request, which is transferred from the storage system 101 via the disk interface 107 of the storage controller 121, as well as an LBA designating the storage point, and write data. Here, when a plurality of write requests arrive in a definite period, the disk interface 207 stores each of these write requests in the data buffer 206, notifies the processor 203, and then advances to the next step S1802. The specific operation is the same as step S901 shown in FIG. 9 and is therefore omitted here.

In step S1802, the processor 203 investigates whether a PBA Page has already been assigned to the LBA Page to which the LBA received in S1801 pertains, and if a PBA Page has already been assigned, the processor 203 processes the following process flow for an update write, and if a PBA Page has not been assigned, the processor 203 processes the following, process flow for a new write.

In specific terms, the processor 203 refers to the address conversion management information shown in FIG. 17, acquires the item value of the PBA Page address 1702 of the LBA Page to which the LBA pertains, and if the acquired value indicates a PBA Page, creates page size update data in the data buffer 206 for an update write operation.

More specifically, the PBA Page assigned to the LBA Page to which the LBA pertains is read from the flash memory 209 and the data thus read is written to the data buffer 206 as previous data.

Subsequently, the processor 203 overwrites the previous data with the update write data received in S1801, and creates update write data for the PBA Page size. Note that here the reading of previous data may target compressed data or may target uncompressed data, but since this will be described in detail in a subsequent read operation, this will be omitted here.

In addition, if the acquired value indicates that a PBA Page has not been assigned, the processor 203 advances to step S1803 for a new write.

In step S1803, the processor 203 compresses a plurality of write data for a new write or update write which is stored in the data buffer all at once. More specifically, the processor 203 reserves a compressed data storage area in the data buffer 206.

The processor 203 then instructs the compress/decompress unit 205 to perform decompression by designating the start address and area size of all the reception-data storage areas and the start address of the compressed data storage area, in the data buffer 206.

After receiving the instruction, the data compress/decompress unit 205 reads data in an amount equal to the area size from the start address of all the reception-data storage areas designated in the data buffer 206 and performs data compression on the read data all at once.

Thereafter, the data compress/decompress unit 205 writes the compressed data in an amount equal to the size of the compressed data generated by the compression from the start address of the compressed data storage area designated in the data buffer 206, and notifies the processor 203 of the data size of the written compressed data.

In step S1804 which follows, the processor 203 calculates the compression effect. In S1804, the processor 203 calculates the number of pages (number of compressed-data storage pages) required for storage from the compressed-data data size reported by the compress/decompress unit 205 in step S1801.

Thereafter, the processor 203 calculates the number of pages that need to be stored (the number of uncompressed data storage pages) from the data size of the plurality of received data stored in the data buffer 206, and finally calculates the difference between the number of compressed data storage pages and the number of uncompressed data storage pages, and takes this difference as the compression effect.

In step S1805, the processor 203 determines, based on the compression effect calculated in the preceding step S1804, which compressed data and uncompressed data of the flash memory is to be written to the flash memories 209 to 217.

Thereupon, the processor 203 determines that there is a compression effect if the compression effect acquired in S1804 is numerically greater than the designated value (the designated number of pages) designated by the system administrator, and advances to step S1807. However, if the compression effect acquired in S1804 is numerically smaller than the designated value, the processor 203 determines that there is no compression effect, discards the compressed data generated in S1803, releases the compressed data storage area in the data buffer 206, and then advances to step S1806.

In S1807, the processor 203 reserves PBA Pages in order to store data for which a compression effect was discerned in S1805.

More specifically, the processor 203 acquires a plurality of consecutive and unassigned PBA Pages equivalent to an area capable of storing the compressed data and advances to S1809. Note that when the unassigned PBA Pages are exhausted, the processor 203 performs a reclamation operation, which is described subsequently, and reserves unassigned PBA Pages.

In S1809, the processor 203 writes compressed data to the plurality of consecutive PBA Pages acquired in the preceding step S1807.

In specific terms, the processor 203 instructs the flash memory interface 208 to perform writing to the flash memories 209 to 217 by designating the start address of the compressed-data storage area storing compressed data in step S1803 in the data storage area in the data buffer 206 and designating the data size of the compressed data and the start addresses of the PBA Pages reserved in S1807 as PBAs.

Thus instructed by the processor 203, the flash memory interface 208 calculates the memory number, the physical block number, and the physical page number from the designated PBA and specifies the physical pages which are write targets from the calculation results.

Subsequently, the flash memory interface 208 reads data from the compressed-data storage area of the data buffer 206 and then writes compressed data to the write target pages.

However, in step S1806, which the processor 203 advances to when a compression effect is not discerned in step S1805 of determining the compression effect, the processor 203 determines the total amount of write data stored in the data buffer 206 as the compression target. In step S1806, the processor 203 discriminates data for which the compression target data is small and a compression effect is not independently generated, and stores write data in the data buffer 206 until the amount of data is such that a compression effect is produced.

If the total amount of data stored in the data buffer 206 is smaller than a designated value which can be optionally changed by the system administrator, the processor 203 ends the write operation in step S1806 once the existing write data has been saved. Note that the designated value used in S1806 can be optionally designated by the system administrator but that a restriction determined by the capacity of the data buffer is taken as the upper limit value.

However, if the total data amount stored in the data buffer 206 is greater than the designated value, the processor 203 determines that a compression effect is not produced even though an adequate amount of data has been taken as the compression target, and determines that the compression target is data which cannot be compressed, and advances to the next step S1808.

In S1808, unwritten PBA Pages are reserved in order to individually store a plurality of write data for which a compression effect is discerned in S1805.

More specifically, the processor 203 individually acquires unwritten PBA Pages in order to store write data for individual, non-consecutive LBA and advances to S1810. Note that when the unassigned PBA Pages are exhausted, the processor 203 performs a reclamation operation, which is described subsequently, and reserves unassigned PBA Pages.

In step S1810, the processor 203 writes the write data, which is written to each of the LBA Pages received in S1801, still in uncompressed format, to each of the PBA Pages acquired in S1808.

In step S1811, at the end of the write operation, the processor 203 updates the address conversion management information (LBA/PBA conversion management information) 1700 after writing compressed data (S1809) or writing uncompressed data (S1810) in the flash memory.

If compressed data is written, the processor 203 registers the start address of PBA Pages to which compressed data has been written in the item of PBA Page 602 of the LBA Pages of the address conversion management information 1700 and sets the compression flag 605.

However, if uncompressed data is written, the processor 203 registers the start address of the PBA Page assigned to the item PBA 602 of the LBA Page in the address conversion management information 1700, and clears the compression flag 605.

In the third embodiment as described thus far, the area required for data storage is reduced as a result of writing the data after performing data compression which is triggered by the write operation. The reduced area is not referred to by the higher-level storage controller 121 and can be freely assigned and managed by the flash module 110. By using this area as an update data storage area, the number of erases inevitably produced by data updates of a certain amount can be reduced in the same way as the case of the first embodiment.

Note that part of the freely managed area reserved through compression may be used to enlarge the LBA space presented to the higher-level storage controller 121 and increase the recording capacity of the flash module 110.

Furthermore, a plurality of write data for which the update writes and LBA are not successive can be compressed all at once and the probability that a compression effect will be determined is raised even with the same compression requirement determination conditions as the first embodiment which likewise performs compression with a write operation serving as the trigger. As a result, the device operating life prolongation effect of the present invention is further increased.

Figure 19:
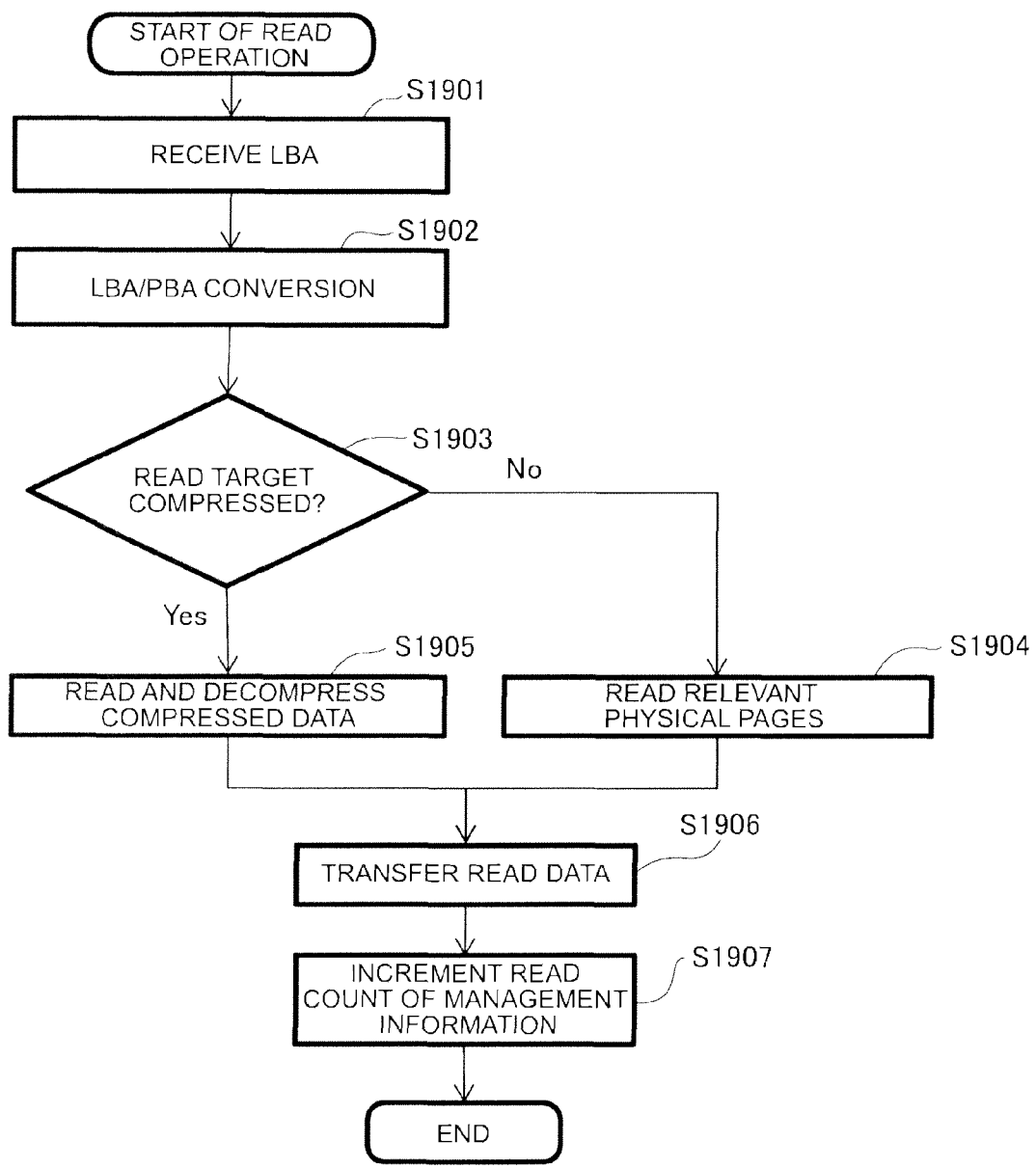
FIG. 19 shows a flowchart illustrating a read operation according to the third embodiment.

A read operation according to the third embodiment will be described next using FIG. 19.

In the very first step S1901 of the read operation, the disk interface 207 of the flash module 110 receives a read request, which is transferred from the storage system 101 via the disk interface 107 of the storage controller 121, as well as an LBA designating the storage point. This operation is substantially the same as step S1101 in FIG. 11 and is therefore not described in any more detail here.

In the subsequent step S1902, the processor 203 searches for the corresponding LBA Page from the item LBA Page address 1701 in the address conversion management information 1700 shown in FIG. 17 based on the acquired LBA and acquires registration information of the PBA Page address 1702 of the LBA Page. The request target PBA Page is specified from this information and the LBA is converted to a PBA.

This conversion finds the LBA relative address on the LBA Page from the difference between the LBA and the LBA Page start address and then calculates the PBA by adding the PBA start address to the LBA relative address.

In step S1903, the processor 203 examines whether the read target destination PBA Page is compressed.

In specific terms, the processor 203 acquires a registration value of the item compression flag 1703 of the LBA group in the address conversion management information (LBA/PBA conversion management information) 1700. If the acquired value is 1, the processor 203 determines the read target as compressed data and moves on to step S1905 but if the acquired value is 0, the processor 203 determines that the read target PBA is reading of an uncompressed PBA Page and advances to step S1904.

In step S1904, the processor 203 reads the physical page designated by the PBA from the flash memories 209 to 217. The specific operation is the same as step S1106 shown in FIG. 11 and will not be described here.

In S1905, for the reading of a compressed data page, compressed data is read from the value indicated by the PBA and decompressed.

More specifically, the processor 203 reserves a compressed data storage area and decompressed data storage area in the data buffer 206.

The processor 203 subsequently instructs the flash memory interface 208 to perform reading by designating the start address of the compressed data as a PBA and designating the data size of the compressed data recorded in compressed data length 1704 of the address conversion management information (LBA/PBA conversion management information) 1700, and the start address of the compressed-data storage area in the data buffer 206.

Thus instructed by the processor 203, the flash memory interface 208 calculates the flash memory number, the physical block number, and the physical page number from the designated PBA, reads the compressed data from the calculation result, and writes the compressed data thus read to the compressed-data area in the data buffer 206.

The processor 203 then instructs the compress/decompress unit 205 to perform data decompression by designating the start address and area size compressed-data storage area the start address of the decompressed data storage in the data buffer 206.

After receiving the instruction, the compress/decompress unit 205 reads data in an amount equal to the area size, based on the start address of the compressed data storage area in the data buffer 206, from the compressed data storage area the data buffer 206, and performs data decompression of the compressed data thus read on the data buffer 206.

Thereafter, the data compress/decompress unit 205 writes the data generated by the decompression from an area corresponding to the start address in the designated decompressed data storage area in the data buffer 206 and notifies the processor 203 of the data size of the decompressed data thus written.

The processor 203 then adds the registration value of the compressed-data relative address 1705 of the address conversion management information 1700 to the start address of the decompressed data storage area, and acquires the address storing the read target page.

In S1906, the processor 203 transfers the data read from the flash memory in S1904 and S1905 to the read request source storage controller 121.

More specifically, the processor 203 instructs the disk interface 207 of the flash memory controller 201 to perform a data transfer by designating the address of the read request target data in the temporary storage area or decompressed data storage area in the data buffer 206.

Thus instructed by the processor 203, the disk interface 207 reads the data from the data buffer 206 and transfers the data thus read to the storage controller 121.

In S1109 which is the last step in the read operation, the value of the read count item 1706 of the address conversion management information is incremented.

As a result of the read operation described thus far, in the third embodiment, the data of an LBA for which reading is requested is transferred to the request source.

The reclamation and refresh operation according to the third embodiment will be described next. The original meanings of the reclamation and refresh operations according to the third embodiment are the same as those of the second embodiment and will therefore not be described here. Similarly to the first embodiment, the third embodiment enables the previous erase time interval to be recorded for each physical block and enables the time elapsed since data was stored to be acquired. According to the third embodiment, a refresh operation is started in the event that the time that elapses after this data storage approaches a finite data protection term for the flash memory.

In addition, according to the third embodiment, the number of valid pages and number of invalid pages are managed for each of the physical blocks and in the even that the PBA Pages which can be newly assigned are exhausted, a reclamation operation is started by taking, as targets, physical blocks with a large number of invalid pages.

Note that the reclamation and refresh operations are the same except for their triggers for operation and therefore both operations will be referred to collectively as the reclamation operation, except for cases where there is a particular need to specify and indicate each operation.

In the third embodiment, because the corresponding relationships between the LBA and PBA are managed not in group units configured from a plurality of physical pages as mentioned in the first embodiment but instead in physical page units which are the minimum write units, a plurality of physical pages with non-consecutive addresses can be simultaneously taken as targets in a reclamation operation. For this reason, during a reclamation operation, data with a low update frequency and low read frequency can be combined from non-consecutive LBA groups.

The third embodiment enables data compression which reduces a drop in device performance from the overhead of compress/decompress processing when referring to compressed data by excluding data of a high update frequency and high read frequency and batch-compressing the data with a low update frequency and low read frequency.

Figure 20:
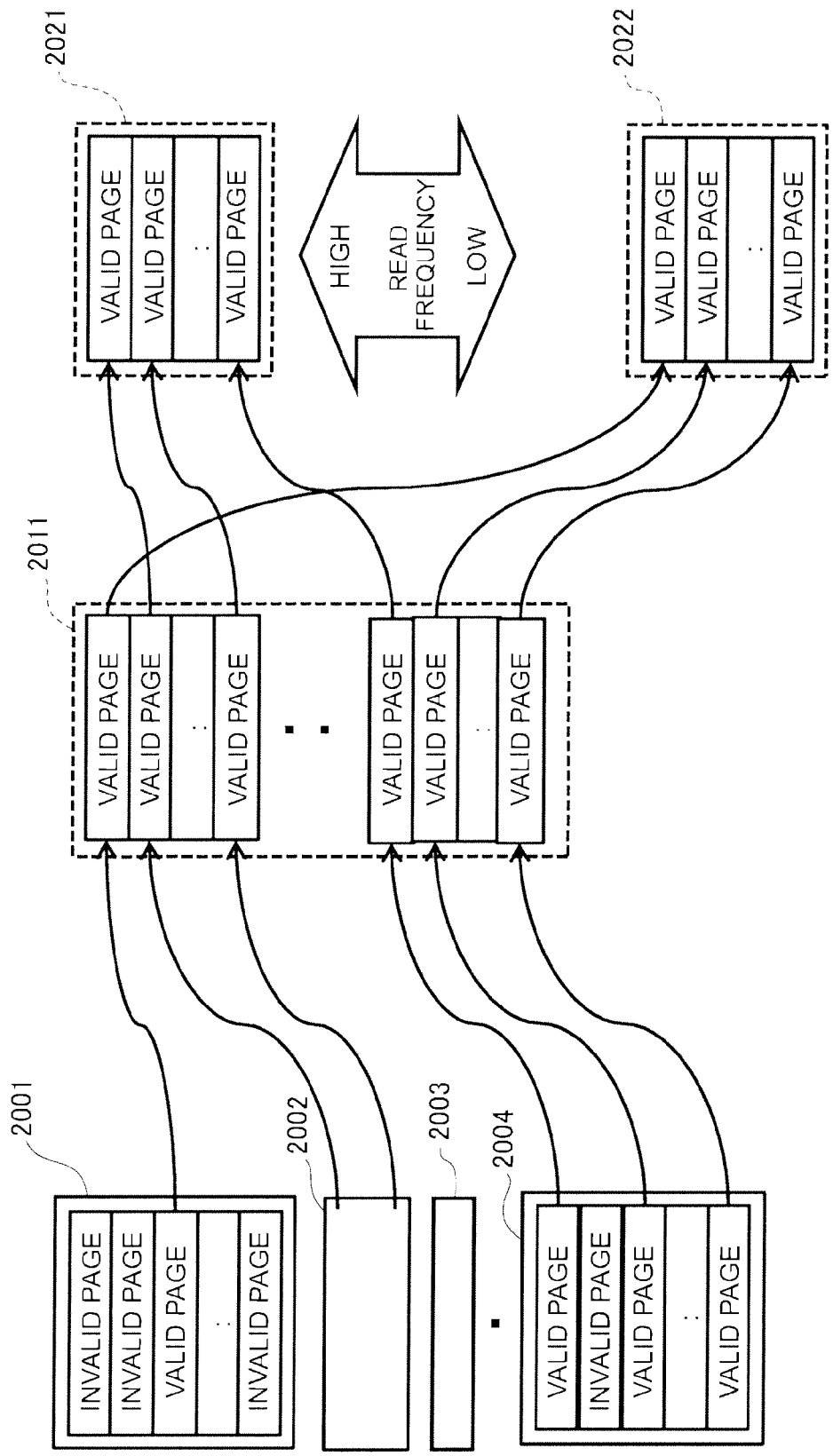
FIG. 20 shows a conceptual view of a reclamation operation according to the third embodiment.

FIG. 20 shows an overview of reclamation according to the third embodiment.

In FIG. 20, the reclamation targets taken are a plurality of physical blocks 2101 to 2104 which serve as reclamation target block groups. Here, each of the active pages of the physical blocks 2001 to 2004 is assigned to an LBA which has not been updated for a definite period, but is in principle identified for reclamation. This set of valid pages can be treated as a low update frequency data group 2111.

In the third embodiment, the processor 203 refers to the read count 1706 in the address conversion management information 1700 in FIG. 17 and manages, as a low update frequency & high read frequency data group 2121, a data group of valid pages which are assigned to LBA Pages with a high read frequency from the low update frequency data group 2111, and manages, as a low update frequency & low read frequency data group 2122, a data group of valid pages which are assigned to LBA Pages with a low read frequency.

If, of these two data groups, the low update frequency & low read frequency data group is taken as the compression target and there is a compression effect after the compression effect determination, compressed data is written to other areas and if there is no compression effect, uncompressed data is written to other areas.

Meanwhile, the low update frequency & high read frequency data group is written to other physical blocks as a non-compression target. After each of these write operations, the address conversion management information 1700 is updated and the plurality of blocks 2001 to 2003, which are the reclamation targets, are made unassigned invalid blocks. The physical blocks 2001 to 2003 which are invalid blocks are erased with optional timing and are unwritten blocks.

Figure 21:
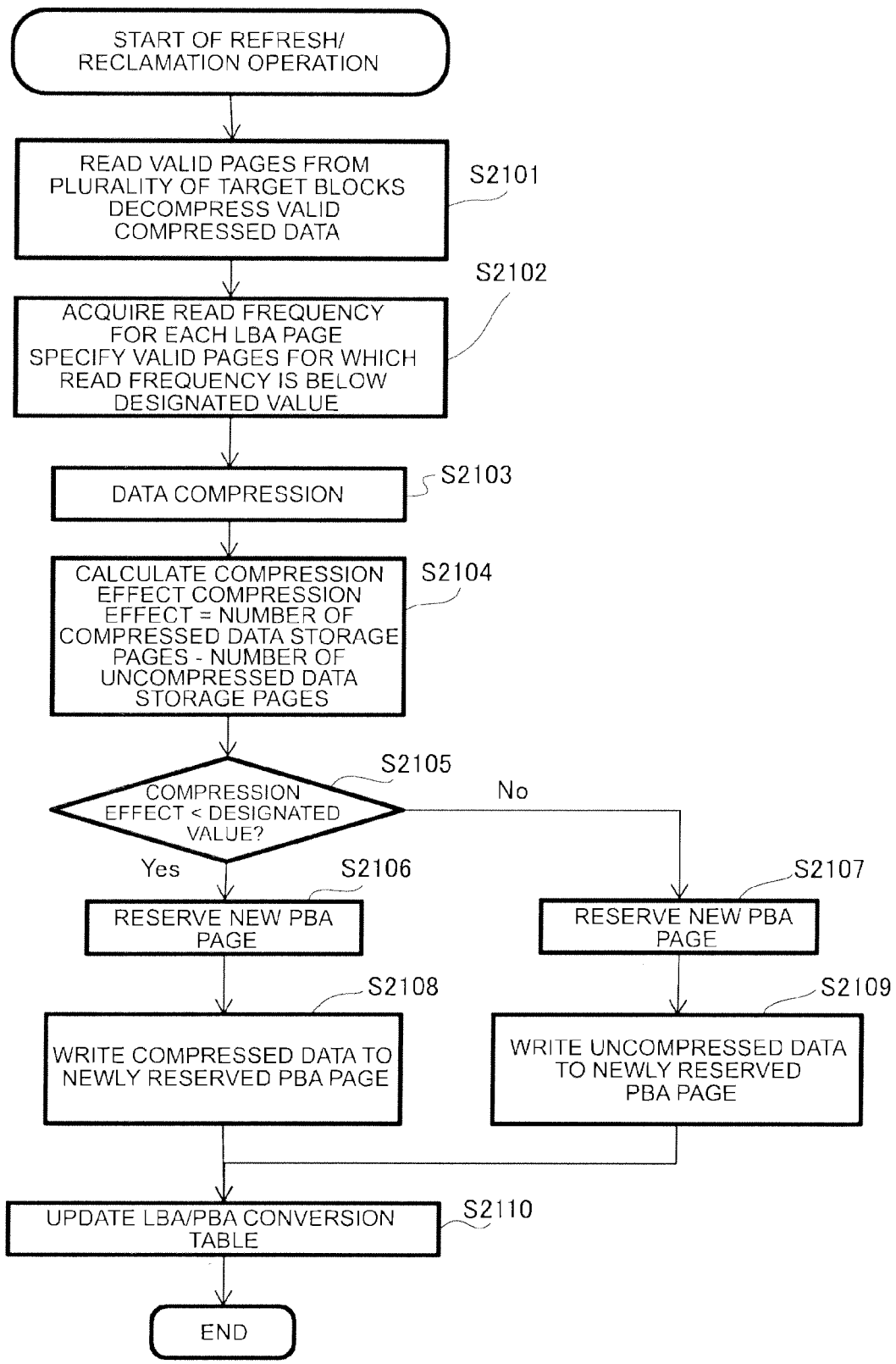
FIG. 21 shows a flowchart illustrating a compression reclamation/refresh operation according to the third embodiment.

A reclamation operation due to data compression in which the low update frequency & low read frequency data group is targeted will be explained hereinbelow using the flowchart shown in FIG. 21.

Note that an uncompressed reclamation operation which targets the low update frequency & high read frequency data group only writes to pages of optional physical blocks other than the target physical blocks, and updates the address conversion management information, and will not be described here.

The very first step S2101 of the reclamation due to data compression shown in FIG. 21 entails reading compressed data (hereinafter called valid compressed data) which is assigned to valid pages and LBAs from a plurality of reclamation target physical blocks. The valid compressed data is decompressed and the valid pages in the compressed data are read.

More specifically, the processor 203 uses the address conversion management information 1700 in FIG. 17 to read all the valid pages and valid compressed data assigned to LBA Pages in the target physical blocks to the data buffer 206 from the flash memory.

The processor 203 then instructs the compress/decompress unit 205 to decompress the valid compressed data in the data buffer 206 and acquires the data of the compressed-data pages assigned to the LBA Pages from the decompressed data.

In the following step S2102, the processor 203 acquires the registration value of the read count 1706 item in the address conversion management information 1700 in FIG. 17 for each LBA Page and acquires the data of the valid pages assigned to the LBA Pages for which the acquired read count is numerically smaller than a value designated by the system administrator.

In step S2103, the data of each of the valid pages stored in the data buffer 206 is compressed. More specifically, the processor 203 reserves a compressed data storage area in the data buffer 206.

The processor 203 then instructs the data compress/decompress unit 205 to perform data compression by designating the start address and area size of the data storage areas of all the valid pages and the start address of the compressed data storage area, which were stored in step S2102 in the data buffer 206, and issues a data compression instruction.

After receiving the instruction, the data compress/decompress unit 206 reads data in an amount equal to the area size from the start addresses of all the valid page data storage areas designated in the data buffer 206 and batch-compresses the read data.

Thereafter, the data compress/decompress unit 205 writes the compressed data generated by the compression in the compressed data size from the start address of the compressed data storage area designated in the data buffer 206 and notifies the processor 203 of the data size of the compressed data thus written.

In step S2104 which follows, the processor 203 calculates the compression effect. In S2104, the processor 203 calculates the number of pages (number of compressed-data storage pages) required for storage from the compressed-data data size reported by the data compress/decompress unit 205 in step 2103.

Thereafter, the processor 203 calculates the number of pages that need to be stored (the number of uncompressed data storage pages) from the data size of the plurality of valid page data stored in the data buffer 206, and finally calculates the difference between the number of compressed data storage pages and the number of uncompressed data storage pages, and takes the calculated difference as the compression effect.

In step S2105, the processor 203 determines, based on the compression effect calculated in the preceding step S2104, which of the compressed data and uncompressed data of the flash memory is to be written to the flash memories 209 to 217.

Thereupon, the processor 203 determines that there is a compression effect if the compression effect acquired in S2104 is greater than the designated value (designated number of pages) designated by the system administrator, and advances to step S1807. However, if the compression effect acquired in S2104 is smaller than the designated value, the processor 203 determines that there is no compression effect, discards the compressed data generated in S2103, releases the compressed data storage area in the data buffer 206, and then advances to the processing of step S2107.

In S2106, the processor 203 reserves PBA Pages in order to store data for which a compression effect was discerned in S2105. More specifically, the processor 203 acquires a plurality of consecutive and unassigned PBA Pages equivalent to an area capable of storing the compressed data and advances to the processing of S2108.

Note that when the unassigned PBA Pages are exhausted, the processor 203 may erase the reclamation source physical blocks and reserve unassigned PBA Pages.

In S2108, the processor 203 writes compressed data to the plurality of consecutive PBA Pages acquired in the preceding step S2108. In specific terms, the processor 203 instructs the flash memory interface 208 to perform writing to the flash memories 209 to 217 by designating the start address of the compressed-data storage area storing compressed data in step S2103 in the data buffer 206 and designating the data size of the compressed data and the start addresses of the PBA Pages reserved in S2106 as PBAs.

Thus instructed by the processor 203, the flash memory interface 208 calculates the flash memory number, the physical block number, and the physical page number from the designated PBA and specifies the physical pages which are write targets from the calculation result.

Subsequently, the flash memory interface 208 reads data from the compressed-data storage area of the data buffer 206 and then writes compressed data to the write target pages.

However, in step S2107, to which the processor 203 advances when a compression effect is not discerned in step S2105 for determining a compression effect, the processor 203 reserves PBA Pages in order to individually store a plurality of valid page data for which a compression effect is not discerned.

More specifically, the processor 203 individually acquires unassigned PBA Pages for the data of each of the valid pages and advances to the processing of S1810. Furthermore, because the valid page data is combined, PBA Pages of specified physical blocks may be reserved in a batch. Thus, by integrating valid page data, data with analogous access patterns and low update- and read frequencies can be gathered in physical blocks.

Note that when the unassigned PBA Pages are exhausted, the processor 203 may erase the reclamation source physical blocks and reserve unassigned PBA Pages.

In step S2109, the processor 203 writes the valid page data acquired in S2102, still in uncompressed format, to each of the PBA Pages acquired in S2107.

In step S2110, at the end of the write operation, the processor 203 updates the LBA/PBA conversion management information 1700 after writing compressed data (S2108) or writing uncompressed data (S2109) in the flash memory.

Here, if compressed data is written, the processor 203 registers the start address of PBA Pages to which compressed data has been written in item PBA Page address 1702 of the LBA Pages of the address conversion management information (LBA/PBA conversion management information) 1700 and sets the compression flag 1703.

Here, if uncompressed data is written, the processor 203 registers the start address of assigned PBA Pages in item PBA Page address 1702 of the LBA Pages of the address conversion management information (LBA/PBA conversion management information) 1700 and clears the compression flag 1703.

As has been described thus far, according to the third embodiment, by performing compression of stored data in response to reclamation and refresh operations and determining the need for compression using the read frequency, data with a low update frequency and low read frequency is compressed, thereby reducing a drop in the device performance as a result of the overhead when referring to compressed data.

Furthermore, as a result of data compression, the number of PBA Pages to which update data is written can be increased. As a result, the frequency with which a reclamation or refresh operation occurs is reduced and the number of erases of the flash memory can be reduced. The operating life of a storage device whose lifespan is determined by the number of erases can therefore be prolonged.

REFERENCE SIGNS LIST

121 to 123 Storage controller
110 Hash module
201 Flash memory controller
205 Data compress/decompress unit
208 Hash memory interface
209 Flash memory
401 Base area page
404 Update area page
501 LBA group
511 PBA group
603 Update area start address
605 Compression Bag
701 Compressed base area page
711 Compressed-data base area page

The invention claimed is:

1. A semiconductor storage device, comprising:
   a plurality of flash memory chips, comprising a plurality of physical blocks, each of which is a unit of erasing data, and comprises a plurality of physical pages, each of which is a unit of reading or writing data; and a flash memory controller configured to control a reading or writing operation to the plurality of flash memory chips, wherein the flash memory controller is configured to:
receive write data;
compress the write data to compressed data;
store the compressed data into at least one physical page of the plurality of flash memory chips when a number of physical pages required to store the compressed data is smaller than a number of physical pages required to store the write data;
manage a logical address space which is an access target of an access request source by dividing the logical address space into a plurality of logical pages, and manage each of the pages in association with the physical pages which belong to an of the physical blocks, and when any of the logical pages is designated in response to a write request from the access request source:
select one, two or more of the physical pages as physical pages which correspond to the designated logical pages; and
store compressed write data on the selected physical pages, form a virtual physical page for storing the compressed write data as data when the compressed write data is virtually decompressed, and change the corresponding relationship between the designated logical page and the one, two or more of the physical pages of the physical block corresponding to the logical page into a corresponding relationship between the designated logical page and the virtual physical pages;
when a logical page, which is the same as the designated logical page, is designated in response to a subsequent access request, process the virtual physical page as an access destination;
accumulate write data which is added to each of the write requests each time a write request is received from the access request source, and batch-compress a plurality of the accumulated write data;
when a compression effect of the compressed write data is greater than a designated value, assuming said condition is fulfilled, store the compressed write data on the selected physical page; and
when the compression effect of the compressed write data is smaller than a designated value, assuming said condition is fulfilled, store the write data added to each of the write requests on the selected physical page.

2. The semiconductor storage device according to claim 1, wherein each of the physical blocks is divided into a base area configured to store new write data among the write data related to a write request and into an update area configured to store an update data which is configured to update the data stored in the base area, and a plurality of physical pages are respectively assigned to the base area and the update area,
wherein the flash memory controller is configured to:
manage a logical address space which is an access target;
divide the logical address space into a plurality of logical groups, wherein each of the logical groups is associated with the base area of each of the physical blocks;
receive a write request designating a logical address of the logical address space;
specify a logical group including the designated logical address;
select a physical block within the base area for storing the compressed write data;
store the compressed write data into a physical page in the selected physical block;
form a virtual page assigned to the physical page which stores the compressed data, for managing the compressed write data as data when the compressed write data is virtually decompressed;
change the corresponding relationship between the specified logical group and the physical page into a corresponding relationship between the specified logical group and the virtual page; and
process the physical page which is assigned to the virtual page as an access destination when the specified logical group, is designated by a subsequent access request.

3. The semiconductor storage device according to claim 1, wherein each of the physical blocks is divided into a base area which is a storage destination of new write data among write data applied to the access request and an update area which is a storage destination of update data, and a plurality of physical pages are respectively assigned to the base area and the update area,
wherein when, as a result of the write data compression, the physical pages serving as write targets among the physical pages which belong to the selected physical block are reduced, the flash memory controller is configured to:
reduce a number of physical pages assigned to the base area belonging to the selected physical block; and
increase a number of physical pages assigned to the update area belonging to the selected physical block.

4. The semiconductor storage device according to claim 1, wherein each of the physical blocks is divided into a base area which is a storage destination of new write data among write data applied to the access request and an update area which is a storage destination of update data, and a plurality of physical pages are respectively assigned to the base area and the update area,
wherein the flash memory controller is configured to:
compare, among the write data, the data size of the write data before the compression with the data size of the write data after the compression;
write the write data after the compression to the base area when the data size of the write data after the compression is smaller than the data size of the write data before the compression by at least size of the physical page; and
write the write data before the compression to the base area when the data size of the write data after the compression is not smaller than the data size of the write data before the compression by at least size of the physical page.

5. The semiconductor storage device according to claim 1, wherein each of the physical blocks is divided into a base area which is a storage destination of new write data among write data applied to the access request and into an update area which is a storage destination of update data, and a plurality of physical pages are respectively assigned to the base area and the update area,
wherein the flash memory controller is configured to, when the data stored on the physical page of the base area belonging to any of the physical blocks is updated in response to the write request as update source data;
create update data from the update source data and the write data applied to the write request;
write the created update data to the update area which belongs to the same physical block as the update source data, and creates update area management information which associates an update source address indicating an access destination of the update source data with an update area address indicating a write destination of the update data, and if the access request is a read request and the update source data is designated in response to the read request;
search for the update area management information;
acquire the update area address; and
read the update data from the update area according to the acquired update area address.

6. The semiconductor storage device according to claim 1, wherein each of the physical blocks is divided into a base area which is a storage destination of new write data among write data applied to the access request and an update area which is a storage destination of update data, and a plurality of physical pages are respectively assigned to the base area and the update area,
wherein the flash memory controller is configured to, when unwritten physical pages of the update area belonging to any of the physical blocks are exhausted, manage the physical block as a reclamation target physical block, and read data of the base area belonging to the reclamation target physical block and update data of the update area belonging to the reclamation target physical block respectively on a data buffer; and
when the read frequency of data read on the data buffer is smaller than a designated value, assuming said condition is fulfilled, compress the data read on the data buffer, erase data in the reclamation target physical block from which data was read onto the data buffer, and write the data compressed on the data buffer to the reclamation target physical block from which the data was erased or to the base area of another physical block which differs from the reclamation target physical block.

7. The semiconductor storage device according to claim 1, wherein each of the physical blocks is divided into a base area which is a storage destination of new write data among write data applied to the access request and an update area which is a storage destination of update data, and a plurality of physical pages are respectively assigned to the base area and the update area,
wherein the flash memory controller is configured to:
when all the data stored in any of the physical blocks has not been an access target for a definite period since being stored, manage, among the physical blocks, a physical block in which data has not been an access target for a definite period since being stored as a refresh target physical block, and read data in the refresh target physical block on a data buffer and
when the read frequency of data read on the data buffer is smaller than a designated value, assuming the above condition is fulfilled, compress the data read on the data buffer, erase data in the refresh target physical block from which data was read onto the data buffer, and write the data compressed on the data buffer to the refresh target physical block from which the data was erased or to the base area of another physical block which differs from the refresh target physical block.

8. The semiconductor storage device according to claim 1, wherein the flash memory controller is configured to, when unwritten physical pages belonging to any of the physical blocks are exhausted:
manage the physical block as a reclamation target physical block;
read data in the reclamation target physical block onto a data buffer;
determine a read frequency level of data read on the data buffer;

batch-compress data with a low read frequency among the data read on the data buffer on the basis of the determination result;
erase data in the reclamation target physical block from which data was read onto the data buffer; and
write the data compressed on the data buffer to the reclamation target physical block from which the data was erased or to the physical pages of another physical block which differs from the reclamation target physical block; and
when all the data stored on a physical page which belongs to any of the physical blocks has not been an access target for a definite period since being stored:
manage the physical block as a refresh target physical block;
read data in the refresh target physical block onto the data buffer;
determine a read frequency level of data read on the data buffer;
batch-compress data with a low read frequency among the data read on the data buffer on the basis of the determination result, erases data in the refresh target physical block from which data was read onto the data buffer; and
write the data compressed on the data buffer to the refresh target physical block from which the data was erased or to the physical pages of another physical block which differs from the reclamation target physical block.

9. A data control method for a semiconductor storage device, the method comprising:
controlling, by a flash memory controller, a reading or writing operation to a plurality of flash memory chips, comprising a plurality of physical blocks, each of which is a unit of erasing data, and comprises a plurality of physical pages, each of which is a unit of reading or writing data,
wherein each of the physical blocks is divided into a base area configured to store new write data among write data and into an update area configured to update data stored in the base area, and a plurality of physical pages are respectively assigned to the base area and the update area;
receiving, by the flash memory controller, write data;
compressing, by the flash memory controller, write data to compress data; and
storing, by the flash memory controller, the compressed data into at least one physical page of the plurality of flash memory chips when a number of physical pages required to store the compressed data is smaller than a number of physical pages required to store the write data;
managing a logical address space which is an access target of an access request source by dividing the logical address space into a plurality of logical pages, and managing each of the logical pages in association with the physical pages which belong to any of the physical blocks, and when any of the logical pages is designated in response to a write request from the access request source:
selecting one, two or more of the physical pages as physical pages which correspond to the designated logical pages; and
storing compressed write data on the selected physical pages, forming a virtual physical page for storing the compressed write data as data when the compressed write data is virtually decompressed, and changing the corresponding relationship between the designated logical page and the one, two or more of the physical pages of the physical block corresponding to the logical page into a corresponding relationship between the designated logical page and the virtual physical pages;

when a logical page, which is the same as the designated logical page, is designated in response to a subsequent access request, processing the virtual physical page as an access destination;

accumulating write data which is added to each of the write requests each time a write request is received from the access request source, and batch-compressing a plurality of the accumulated write data;

when a compression effect of the compressed write data is greater than a designated value, assuming said condition is fulfilled, storing the compressed write data on the selected physical page; and when the compression effect of the compressed write data is smaller than a designated value, assuming said condition is fulfilled, storing the write data added to each of the write requests on the selected physical page.

10. The data control method for a semiconductor storage device according to claim 9, further comprising:

managing, by the flash memory controller, a logical address space which is an access target group;

dividing, by the flash memory controller, the logical address space into a plurality of logical groups, wherein each of the logical groups is associated with the base area of each of the physical blocks;

receiving a write request designating a logical address of the logical address space;

specifying a logical group including the designated logical address;

selecting a physical block within the base area for storing the compressed write data;

storing the compressed write data into a physical page in the selected base physical block;

forming a virtual page assigned to the physical page which stores the compressed data, for managing the compressed write data as data when the compressed write data is virtually decompressed;

changing the corresponding relationship between the specified logical group and the physical page into a corresponding relationship between the specified logical group and the virtual page; and when a logical group is designated by a subsequent access request, processing the physical page which is assigned to the virtual page as an access destination.

11. The data control method for a semiconductor storage device according to claim 9, further comprising:

when, as a result of the write data compression, the physical pages serving as write targets among the physical pages which belong to the selected physical block are reduced, reducing, by the flash memory controller, a number of physical pages assigned to the base area belonging to the selected physical block; and increasing, by the flash memory controller, a number of physical pages assigned to the update area belonging to the selected physical block.

12. The data control method for a semiconductor storage device according to claim 9, further comprising:

comparing, by the flash memory controller, among the write data, the data size of the write data before the compression with the data size of the write data after the compression;

when the data size of the write data after the compression is smaller than the data size of the write data before the compression by at least size of the physical page, writing, by the flash memory controller, the write data after the compression to the base area; and when the data size of the write data after the compression is not smaller than the data size of the write data before the compression by at least size of the physical page, writing, by the flash memory controller, the write data before the compression to the base area.

13. The data control method for a semiconductor storage device according to claim 9, further comprising:

when the data stored on the physical page of the base area belonging to any of the physical blocks is updated by the write request as update source data:

creating, by the flash memory controller, update data from the update source data and the write data applied to the write request;

writing, by the flash memory controller, the created update data to the update area which belongs to the same physical block as the update source data; and creating, by the flash memory controller, update area management information which associates an update source address indicating an access destination of the update source data with an update area address indicating a write destination of the update data; and when the access request is a read request and the update source data is designated in response to the read request:

searching, by the flash memory controller, for the update area management information, acquires the update area address; and reading, by the flash memory controller, the update data from the update area according to the acquired update area address.

14. A storage system comprising:

a plurality of semiconductor storage devices, and a storage controller configured to control the plurality of semiconductor storage devices as a RAID group, wherein each of the plurality of semiconductor storage devices comprises:

a plurality of flash memory chips which comprise a plurality of physical blocks, each of which is a unit of erasing data, and comprises a plurality of physical pages, each of which is a unit of reading or writing data; and a flash memory controller which is configured to:

control reading or writing operation to the plurality of flash memory chips;

receive write data;

compress the write data to compressed data;

store the compressed data into at least one physical page of the plurality of flash memory chips when a number of a physical page required to store the compressed data is smaller than a number of physical pages required to store the write data;

manage a logical address space which is an access target of an access request source by dividing the logical address space into a plurality of logical pages, and manage each of the logical pages in association with the physical pages which belong to any of the physical blocks, and when any of the logical pages is designated in response to a write request from the access request source:

select one, two or more of the physical pages as physical pages which correspond to the designated logical pages; and store compressed write data on the selected physical pages, form a virtual physical page for storing the compressed write data as data when the compressed write data is virtually decompressed, and change the corresponding relationship between the designated logical page and the one, two or more of the physical pages of the physical block corresponding to the logical page into a corresponding relationship between the designated logical page and the virtual physical pages;

when a logical page, which is the same as the designated logical page, is designated in response to a subsequent access request, process the virtual physical page as an access destination;

accumulate write data which is added to each of the write requests each time a write request is received from the access request source, and batch-compress a plurality of the accumulated write data;

when a compression effect of the compressed write data is greater than a designated value, assuming said condition is fulfilled, store the compressed write data on the selected physical page; and when the compression effect of the compressed write data is smaller than a designated value, assuming said condition is fulfilled, store the write data added to each of the write requests on the selected physical page.

* * * * *